(12) United States Patent
Yin et al.

(10) Patent No.: US 11,528,543 B2
(45) Date of Patent: Dec. 13, 2022

(54) TERMINAL DEVICE AND SOUND-EMITTING APPARATUS

(71) Applicant: Huawei Technologies Co., Ltd., Shenzhen (CN)

(72) Inventors: Bangshi Yin, Beijing (CN); Fan Yang, Beijing (CN); Dong Ma, Beijing (CN); Kangle Xue, Beijing (CN); Bin Yan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/652,124

(22) PCT Filed: Sep. 30, 2018

(86) PCT No.: PCT/CN2018/108928
§ 371 (c)(1),
(2) Date: Mar. 30, 2020

(87) PCT Pub. No.: WO2019/062997
PCT Pub. Date: Apr. 4, 2019

(65) Prior Publication Data
US 2020/0252706 A1  Aug. 6, 2020

(30) Foreign Application Priority Data

Sep. 30, 2017  (CN) .......................... 201710918934.7
May 29, 2018  (CN) .......................... 201810526915.4

(51) Int. Cl.
*G06F 1/16*  (2006.01)
*H04R 1/02*  (2006.01)
*H04N 5/225*  (2006.01)

(52) U.S. Cl.
CPC ........... *H04R 1/028* (2013.01); *G06F 1/1613* (2013.01); *H04N 5/2253* (2013.01);
(Continued)

(58) Field of Classification Search
CPC ................ H04R 2499/15; H04R 1/028; H04R 2499/11; H04M 1/0266; H04M 1/035;
(Continued)

(56) References Cited

U.S. PATENT DOCUMENTS

2014/0168867 A1    6/2014  Choi et al.
2015/0382090 A1*  12/2015  Bisset .................. H04R 1/2857
                                                                381/386
(Continued)

FOREIGN PATENT DOCUMENTS

CN    103841222 A    6/2014
CN    104954519 A    9/2015
(Continued)

OTHER PUBLICATIONS

Machine translation of CN 105721636(A), 18 pages. (Year: 2016).*

*Primary Examiner* — Ping Lee
(74) *Attorney, Agent, or Firm* — Conley Rose, P.C.

(57) ABSTRACT

A terminal device and a sound-emitting apparatus arranged in the terminal device, where the terminal device includes a housing, a display is arranged on a surface of the housing, a notch is formed at an end of the display, and a camera system is arranged inside the housing. The camera system is arranged opposite to the notch in a direction perpendicular to the display, and a camera of the camera system is located inside the notch. A through-hole is arranged opposite to an opening of the notch in the housing in a direction parallel to the display.

20 Claims, 29 Drawing Sheets

(52) U.S. Cl.
CPC ....... *H04N 5/2257* (2013.01); *H04R 2499/11* (2013.01); *H04R 2499/15* (2013.01)

(58) Field of Classification Search
CPC ............... H04M 1/0264; G06F 1/1613; H04N 5/2253; H04N 5/2257
See application file for complete search history.

(56) References Cited

U.S. PATENT DOCUMENTS

| | | |
|---|---|---|
| 2017/0154609 A1 | 6/2017 | Yoon et al. |
| 2018/0316784 A1 | 11/2018 | Bao |
| 2019/0394316 A1 | 12/2019 | Zhang |

FOREIGN PATENT DOCUMENTS

| | | | |
|---|---|---|---|
| CN | 105611007 | A | 5/2016 |
| CN | 105721636 | A | 6/2016 |
| CN | 105827915 | A | 8/2016 |
| CN | 205622861 | U | 10/2016 |
| CN | 106101950 | A | 11/2016 |
| CN | 106331963 | A | 1/2017 |
| CN | 106453722 | A | 2/2017 |
| CN | 106603774 | A | 4/2017 |
| CN | 106657485 | A | 5/2017 |
| CN | 106708201 | A | 5/2017 |
| CN | 106713549 | A | 5/2017 |
| CN | 106850891 | A | 6/2017 |
| CN | 107124490 | A | 9/2017 |
| CN | 107145192 | A | 9/2017 |
| EP | 3396932 | A1 | 10/2018 |

\* cited by examiner

TERMINAL DEVICE AND SOUND-EMITTING APPARATUS

CROSS-REFERENCE TO RELATED APPLICATIONS

This application is a U.S. National Stage of International Patent Application No. PCT/CN2018/108928 filed on Sep. 30, 2018, which claims priority to Chinese Patent Application No. 201710918934.7 filed on Sep. 30, 2017 and Chinese Patent Application No. 201810526915.4 filed on May 29, 2018. All of the aforementioned applications are hereby incorporated by reference in their entireties.

TECHNICAL FIELD

This application relates to the field of communications technologies, and in particular, to a terminal device and a sound-emitting apparatus.

BACKGROUND

In a current development trend of terminal devices such as smartphones, functions that can be implemented by the terminal devices are constantly expanding. For the terminal devices, consumers are no longer just satisfied with requirements for calls, and a demand for display is also constantly increasing. From feature phones with numeric keypads to terminal devices with resistive touchscreens or capacitive touchscreens, a size of a display module has also developed to 5.5 inches or even larger. Large-screen terminal devices are increasingly popular among consumers.

An existing terminal device may be shown in FIG. 1. A plurality of devices such as a front-facing camera hole 101, an earpiece hole 102, an ambient light sensor, an optical proximity sensor, and a front camera flash 104 are arranged in a top region 100 of the terminal device. An earpiece body 105 is located in the terminal device and arranged below the earpiece hole 102 toward the inside of a mobile phone. Specifically, the earpiece body 105 is arranged in a region formed between a housing of the terminal device and a display module 106. Because the earpiece body 105 and devices located in the top region 100 all have considerable volumes, a non-display area of the terminal device, namely, the top region 100, occupies a relatively large area, and a screen-to-body ratio cannot be effectively improved.

SUMMARY

Based on the foregoing description, this application provides a terminal device and a sound-emitting apparatus that can be arranged in the terminal device, to improve a sound guiding effect while increasing a screen-to-body ratio.

An aspect of this application provides a terminal device, and the terminal device includes a housing. A display module is arranged on a surface of the housing, and a camera module is arranged inside the housing. In a direction perpendicular to the display module, the camera module is arranged opposite to a notch, and a camera of the camera module is located inside the notch. A through-hole is arranged in the housing, and in a direction parallel to the display module, the through-hole is arranged opposite to an opening of the notch. A sound-emitting device is arranged inside the housing and below the display module, and at least one sound cavity is arranged to be connected to the sound-emitting device. Any one of the at least one sound cavity is connected to both the sound-emitting device and the through-hole, and the any one of the at least one sound cavity is configured to guide, to the through-hole, a sound emitted by the sound-emitting device, to dissipate, through the through-hole, the sound emitted by the sound-emitting device.

The at least one sound cavity connected to the sound-emitting device is arranged within limited space inside the terminal device, so that the terminal device can guide, to the through-hole located in the terminal device, the sound emitted by a sound-emitting device, to effectively improve an effect of guiding a sound from the sound-emitting device, and ensure an effect of a sound dissipated from the through-hole.

In some possible implementations, in the direction perpendicular to the display module, an overlapping area of the sound-emitting device and the through-hole is less than or equal to a preset value, and the preset value is greater than or equal to zero.

In some possible implementations, a sound-emitting apparatus is included inside the housing, the sound-emitting apparatus includes a first accommodation cavity, the first accommodation cavity is configured to accommodate the sound-emitting device for arrangement, and the at least one sound cavity is arranged inside the sound-emitting apparatus. A sealing member is arranged between the sound-emitting device and the first accommodation cavity, and the sealing member is configured to achieve an interference fit between the first accommodation cavity and the sound-emitting device.

In some possible implementations, a first sound cavity is formed between the sound-emitting device and the sound-emitting apparatus, and the first sound cavity is arranged exactly above the sound-emitting device. The first sound cavity is configured to guide the sound emitted by the sound-emitting device. A second sound cavity is arranged at the top of the sound-emitting apparatus, and in the direction perpendicular to the display module, the second sound cavity is arranged opposite to the through-hole. The second sound cavity is configured to guide, to the through-hole, the sound guided by the first sound cavity.

In some possible implementations, the first sound cavity is connected to the second sound cavity.

In some possible implementations, a third sound cavity is arranged between the first sound cavity and the second sound cavity. The third sound cavity is connected to both the first sound cavity and the second sound cavity, and the third sound cavity is configured to guide, to the second sound cavity, the sound guided by the first sound cavity.

In some possible implementations, a fourth sound cavity is arranged inside the sound-emitting apparatus. A second accommodation concave cavity is arranged to be recessed in an outer peripheral wall of the fourth sound cavity, and the second accommodation concave cavity is configured to fasten the camera module. The fourth sound cavity is connected to both the first sound cavity and the second sound cavity, and the fourth sound cavity is configured to guide, to the second sound cavity, the sound guided by the first sound cavity.

In some possible implementations, a third accommodation cavity is further included inside the sound-emitting apparatus, and the third accommodation cavity is configured to accommodate the camera module for arrangement. A fifth sound cavity is arranged at the bottom of the sound-emitting apparatus, a sixth sound cavity is formed between the fifth sound cavity and the third accommodation cavity, and the fifth sound cavity is connected to both the first sound cavity and the sixth sound cavity. A seventh sound cavity is further formed between the third accommodation cavity and the sound-emitting apparatus, the seventh sound cavity is connected to all of the second sound cavity, the fifth sound cavity, and the sixth sound cavity, and the seventh sound cavity is configured to guide, to the second sound cavity, sounds guided by the fifth sound cavity and the sixth sound cavity.

Another aspect of this application provides a sound-emitting apparatus. The sound-emitting apparatus is arranged inside a terminal device, a terminal housing is arranged for the terminal device, and a display module is arranged on a surface of the housing. A sound-emitting device is arranged inside the housing and below the display module, and at least one sound cavity is arranged to be connected to the sound-emitting device. Any one of the at least one sound cavity is connected to both the sound-emitting device and a through-hole. The through-hole is arranged in the housing, the any one of the at least one sound cavity is configured to guide, to the through-hole, a sound emitted by the sound-emitting device, to dissipate, through the through-hole, the sound emitted by the sound-emitting device.

In some possible implementations, in a direction perpendicular to the display module, an overlapping area of the sound-emitting device and the through-hole is less than or equal to a preset value, and the preset value is greater than or equal to zero.

In some possible implementations, the sound-emitting apparatus includes a first accommodation cavity, and the first accommodation cavity is configured to accommodate the sound-emitting device for arrangement. A sealing member is arranged between the sound-emitting device and the first accommodation cavity, and the sealing member is configured to achieve an interference fit between the first accommodation cavity and the sound-emitting device.

In some possible implementations, a first sound cavity is formed between the sound-emitting device and the sound-emitting apparatus, and the first sound cavity is arranged exactly above the sound-emitting device. The first sound cavity is configured to guide the sound emitted by the sound-emitting device. A second sound cavity is arranged at the top of the sound-emitting apparatus, and in the direction perpendicular to the display module, the second sound cavity is arranged opposite to the through-hole. The second sound cavity is configured to guide, to the through-hole, the sound guided by the first sound cavity.

In some possible implementations, the first sound cavity is connected to the second sound cavity.

In some possible implementations, a third sound cavity is arranged between the first sound cavity and the second sound cavity. The third sound cavity is connected to both the first sound cavity and the second sound cavity, and the third sound cavity is configured to guide, to the second sound cavity, the sound guided by the first sound cavity.

In some possible implementations, a fourth sound cavity is arranged inside the sound-emitting apparatus, and a second accommodation concave cavity is arranged to be recessed in an outer peripheral wall of the fourth sound cavity. The second accommodation concave cavity is configured to fasten a camera module. A notch is formed at an end of the display module, and in the direction perpendicular to the display module, the camera module is arranged opposite to the notch. A camera of the camera module is located inside the notch. The fourth sound cavity is connected to both the first sound cavity and the second sound cavity, and the fourth sound cavity is configured to guide, to the second sound cavity, the sound guided by the first sound cavity.

In some possible implementations, a third accommodation cavity is further included inside the sound-emitting apparatus, and the third accommodation cavity is configured to accommodate the camera module for arrangement. A fifth sound cavity is arranged at the bottom of the sound-emitting apparatus, a sixth sound cavity is formed between the fifth sound cavity and the third accommodation cavity, and the fifth sound cavity is connected to both the first sound cavity and the sixth sound cavity. A seventh sound cavity is further formed between the third accommodation cavity and the sound-emitting apparatus, the seventh sound cavity is connected to all of the second sound cavity, the fifth sound cavity, and the sixth sound cavity, and the seventh sound cavity is configured to guide, to the second sound cavity, sounds guided by the fifth sound cavity and the sixth sound cavity.

DESCRIPTION OF EMBODIMENTS

Figure 2:
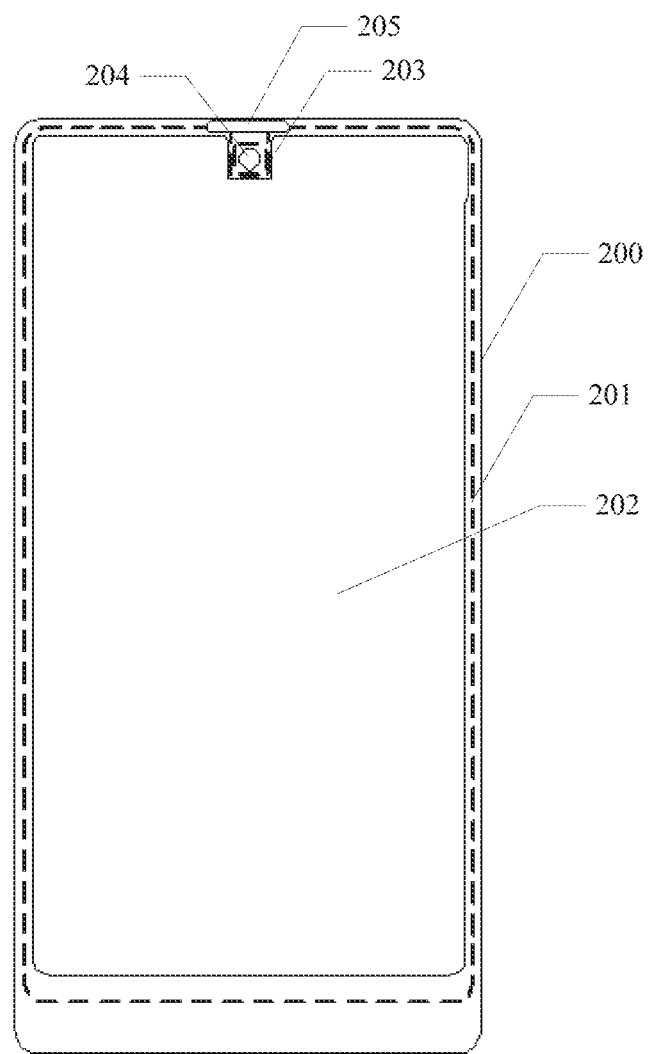
FIG. 2 is a schematic top view of a structure of another embodiment of a terminal device according to the present invention.

This application provides a terminal device that can improve a screen-to-body ratio. The following uses examples to first describe a structure of the terminal device with reference to FIG. 2. FIG. 2 is a schematic diagram of a front structure of an embodiment of a terminal device according to the present invention.

As shown in FIG. 2, the terminal device includes a housing 200. A specific structure of the housing 200 is not limited in this embodiment, provided that the housing 200 is a frame of the terminal. The structure may be a support structure formed by a rear housing, a front housing, a middle frame, or any combination thereof. Various devices that can make the terminal device run normally may be installed inside the housing 200. The following uses examples to describe, with reference to FIG. 3, the various devices installed inside the housing 200.

Figure 3:
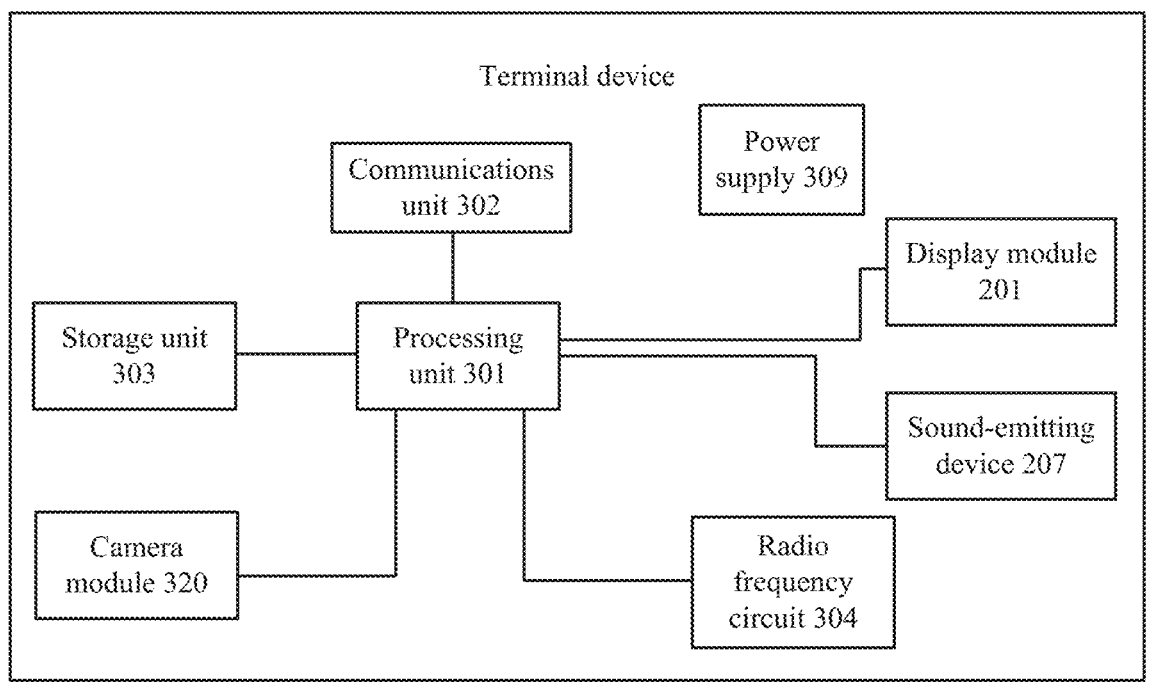
FIG. 3 is a schematic diagram of an internal device connection structure of an embodiment of a terminal device according to the present invention.

As shown in FIG. 3, the terminal device may include components such as a processing unit 301, a communications unit 302, a storage unit 303, and a radio frequency circuit 304.

Specifically, these components perform communication by using one or more buses. A person skilled in the art may understand that a structure of the terminal device shown in FIG. 3 constitutes no limitation on the present invention, and the structure of the terminal device may be a bus structure or a star structure. The terminal device may include more or fewer components than those shown in the figure, or a combination of some components, or a different arrangement of components.

In implementations of the present invention, the terminal device may be any mobile or portable electronic device, including but not limited to a smartphone, a mobile computer, a tablet computer, a personal digital assistant (PDA), a smart band, a smartwatch, a media player, and the like.

A display module 201 and a sound-emitting device 207 are arranged to be connected to the processing unit 301. For details, referring to FIG. 2, the display module 201 is fixedly installed on a surface of the housing 200.

A specific type of the display module 201 is not limited in this embodiment. In this embodiment, that the display module 201 is a liquid crystal display (LCD) is used as an example for description.

In another embodiment, the display module 201 may alternatively be a thin film transistor (TFT), a splice liquid crystal display (SLCD), an active-matrix organic light emitting diode (AMOLED), or the like.

The sound-emitting device 207 in this embodiment may be a loudspeaker.

The processing unit 301 is configured to run corresponding code and process received information, so as to generate and output a corresponding interface, so that the display module 201 can display the corresponding interface.

For example, the processing unit 301 may include only a central processing unit (CPU), or may be a combination of a graphics processing unit (GPU), a digital signal processor (DSP), and a control chip (for example, baseband chip) in the communications unit.

The storage unit 303 is configured to store code and data, where the code is run by the processing unit 301.

The communications unit 302 is configured to establish a communication channel, so that the terminal device connects to a remote server by using the communication channel and downloads media data from the remote server.

The radio frequency circuit 304 is configured to receive and send a signal in an information receiving and sending process or in a call process. For example, after receiving downlink information of a base station, the radio frequency circuit 304 sends the downlink information to the processing unit 301 for processing, and sends designed uplink data to the base station.

A power supply 309 is configured to supply power to different components of the terminal device to maintain running of the components. Generally, the power supply 309 may be a built-in battery.

A screen-to-body ratio of the terminal device provided in this application is described below.

As shown in FIG. 2, an LCD is used as an example of the display module 201 in this embodiment. There is an active area (AA) 202 on the display module 201. The AA area 202 in this embodiment is an area in which a picture can be effectively displayed when the display module 201 is powered on.

The screen-to-body ratio in this embodiment is a ratio of an area of the AA area 202 of the terminal device to an area of a panel of the terminal device.

The panel of the terminal device in this embodiment is a region surrounded by four edges of the housing 200. It can be learned that the area of the panel of the terminal device in this embodiment is an area of an end face used to accommodate the display module 201 by the housing 200. In other words, the area of the panel of the terminal device is an area of the front of the terminal device.

It can be learned that the display module 201 and devices such as an optical proximity sensor, an ambient light sensor, a front camera flash, and a fingerprint sensor are arranged on the panel of the terminal device.

The following describes, in detail, how the screen-to-body ratio of the terminal device is specifically improved for the terminal device in this application.

Figure 1:
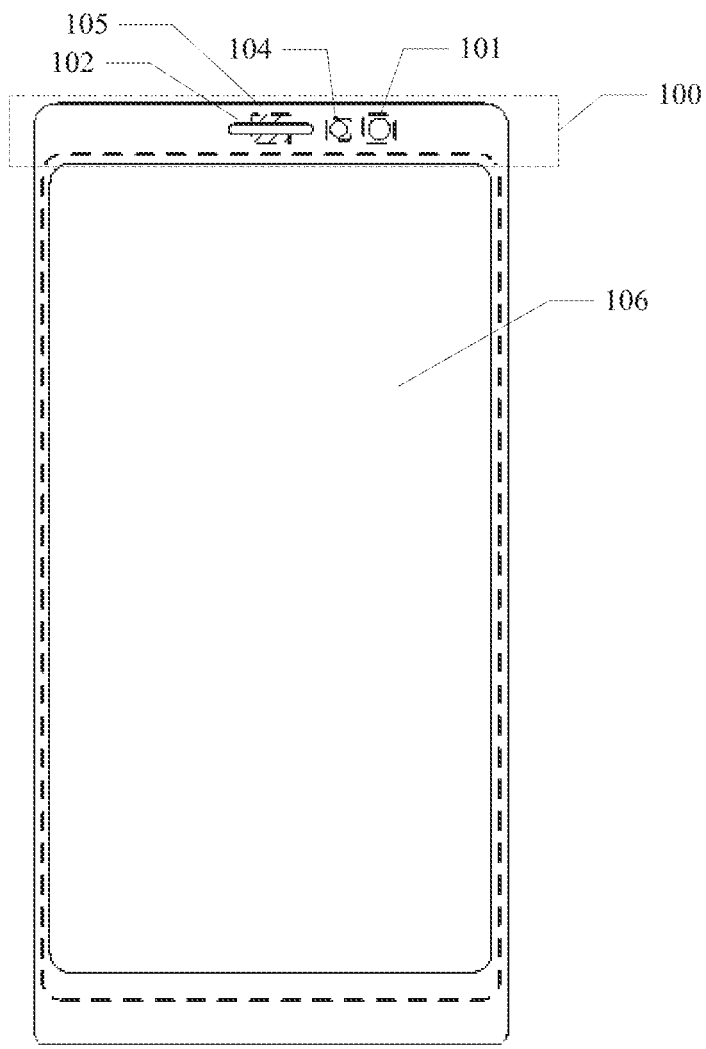
FIG. 1 is a schematic top view of a structure of an embodiment of a terminal device according to the present invention.

As shown in FIG. 1, because a non-display region, namely, a top region 100 of the terminal device exists, an area of the display module decreases, thereby reducing the screen-to-body ratio of the terminal device. In this embodiment, as shown in FIG. 2, to increase an area of the display module 201, the top of the display module 201 and an edge located at the top of the housing 200 in this embodiment may be arranged to abut against each other.

It can be learned that, compared with the prior art, the terminal device in this embodiment does not require arrangement of the top region 100 shown in FIG. 1, or an area of the top region 100 is greatly decreased, so that the area of the display module and the screen-to-body ratio of the terminal device are increased for the terminal device in this embodiment, thereby further improving user experience.

The following describes how the sound-emitting device 207 is arranged when the top region 100 is not arranged on the terminal device in this embodiment: Still referring to FIG. 2, in an extension direction of the display module 201, a notch 203 is formed at an end of the display module 201.

Figure 4:
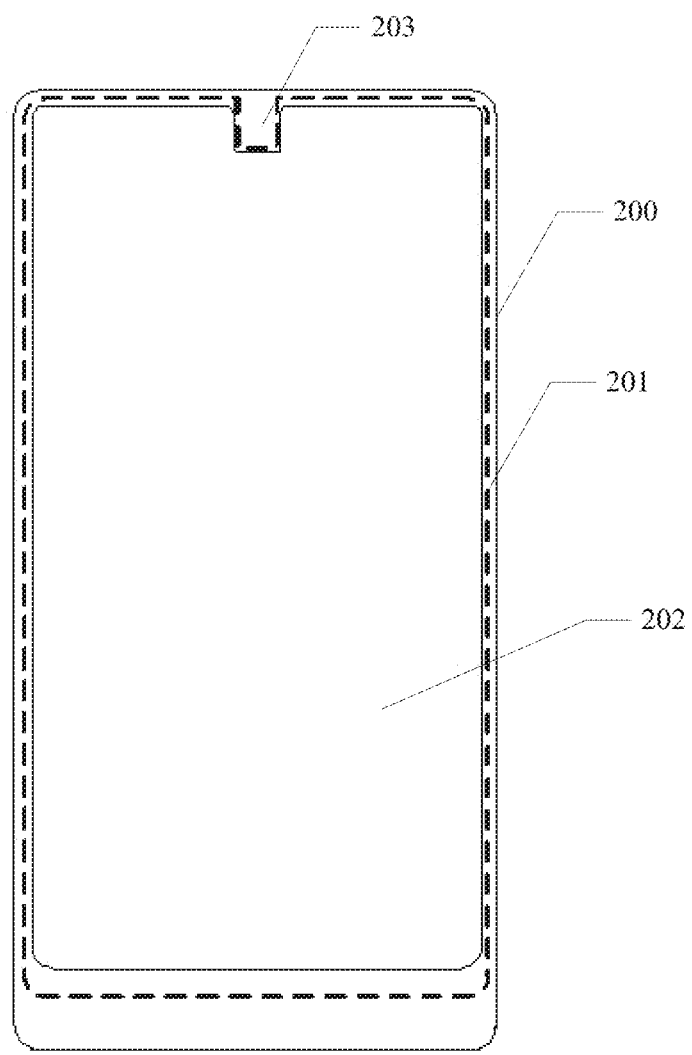
FIG. 4 is a schematic top view of a structure of another embodiment of a terminal device according to the present invention.
Figure 5:
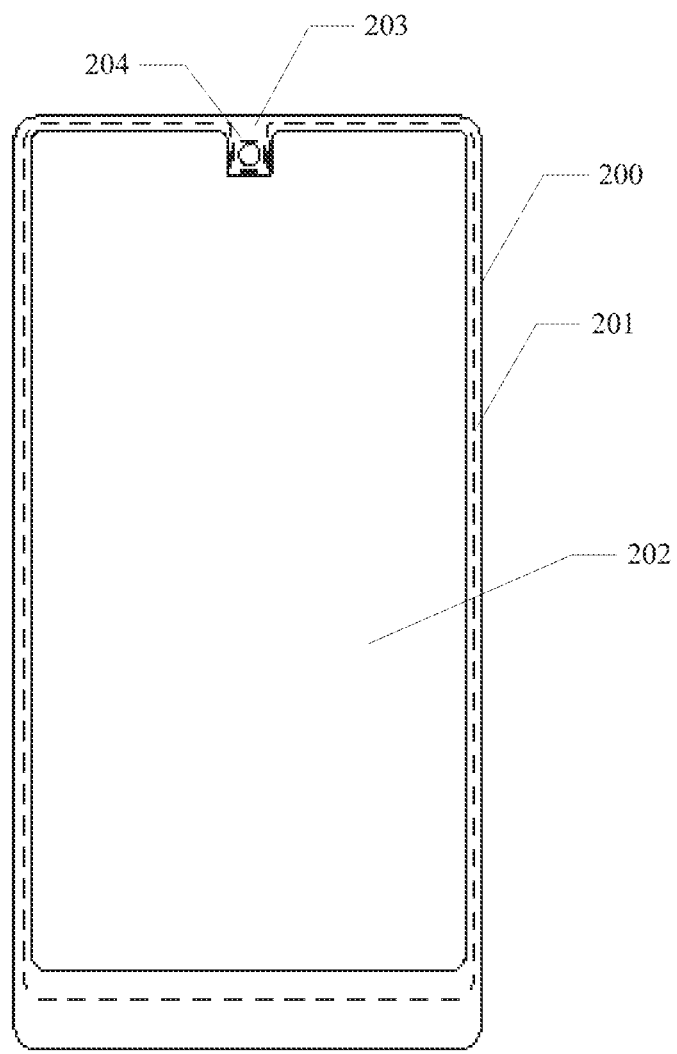
FIG. 5 is a schematic top view of a structure of another embodiment of a terminal device according to the present invention.

For details, refer to FIG. 4. The notch 203 is arranged to penetrate the end of the display module 201 in a direction perpendicular to the terminal device, and an opening of the notch 203 is arranged toward the edge located at the top of the housing 200.

With reference to FIG. 3, a digital camera (also referred to as digital still camera, DS) 320 connected to the processing unit 301 is arranged inside the housing 200. Certainly, the digital camera may alternatively become a camera module, a camera unit including a camera, or the like. The camera module 320 is not limited in this embodiment, provided that the camera module located inside the terminal device can convert an optical image into electronic data by using an electronic sensor.

With reference to FIG. 2 and FIG. 3, a camera 204 of the camera module is configured to input a light ray into the camera module 320, so that the camera module 320 can convert the light ray into an imageable digital signal by using an imaging component.

To enable the terminal device to shoot an image by using the camera 204, the camera 320 is arranged opposite to the notch 203 in a direction perpendicular to the display module 201, so that the camera 204 of the camera 320 can be exposed through a hollowed-out region formed by the notch 203, and the camera 204 can shoot an image.

As shown in FIG. 2, a through-hole 205 is arranged in the housing 200.

Specifically, the through-hole 205 in this embodiment is an exterior hole penetrating a front end of the housing 200.

The through-hole 205 in this embodiment may be of a strip-shaped structure. For another example, the through-hole 205 is of a ring-shaped structure. For another example, the through-hole 205 is of a circular structure. A specific shape of the through-hole 205 is not limited in this embodiment.

Figure 6:
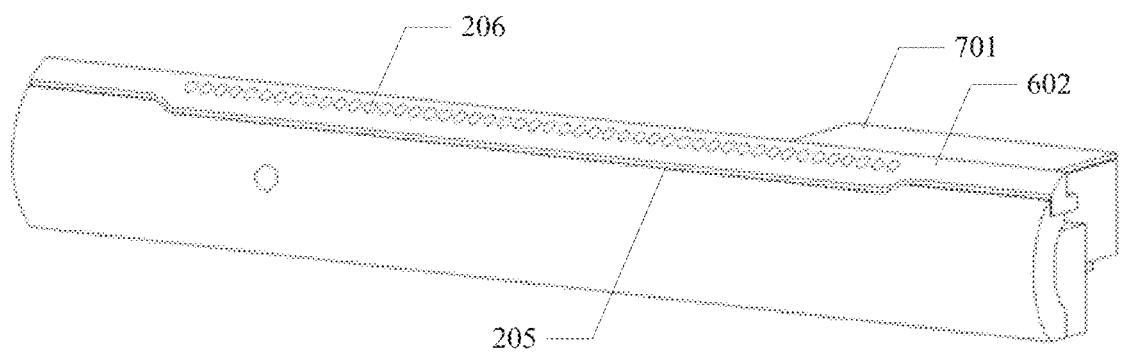
FIG. 6 is a schematic diagram of a partial structure of an embodiment of a terminal device according to the present invention.

Using FIG. 6 as an example, that the through-hole 205 is of a strip-shaped structure and both sides of the through-hole 205 are symmetrical about a center line of the terminal device is used as an example for description in this embodiment. An arrangement manner of the through-hole 205 in this embodiment is used, so that when a user uses the terminal device, the through-hole 205 can be arranged to exactly face an ear of the user, an effect of a sound dissipated by the through-hole 205 is improved, and the user can hear a more balanced sound effect by using the evenly arranged through-hole 205.

A sound-emitting apparatus is arranged inside the housing 200 and below the display module 201, and the sound-emitting apparatus includes a sound-emitting device, at least one sound cavity, and an earpiece hole group that includes a plurality of earpiece holes 206.

An external shape of the earpiece hole group in this embodiment fits a shape of the through-hole 205, so that the earpiece hole group can be arranged to be inserted inside the through-hole 205, and the earpiece hole group is exposed through the through-hole 205.

A shape of the earpiece hole 206 is not limited in this embodiment. For example, each earpiece hole 206 may be of a circular shape, an elliptic shape, a square shape, an irregular shape, or the like.

Specifically, the sound cavity is configured to guide, to the earpiece hole group located inside the through-hole 205, a sound emitted by the sound-emitting device, so that the earpiece hole group can dissipate the sound emitted by the sound-emitting device.

According to the terminal device in this embodiment, the sound-emitting device is arranged below the display module 201, so that in a direction parallel to the display module, the sound-emitting device and the display module 201 are arranged in a staggered manner, thereby preventing the sound-emitting device from occupying the area of the panel of the terminal device, increasing an area of the display module, and further effectively increasing the screen-to-body ratio of the terminal device.

To better understand the sound-emitting apparatus provided in the present invention, the following describes several structures of the sound-emitting apparatus with reference to the accompanying drawings. It should be made clear that descriptions of the structures of the sound-emitting apparatus in this embodiment are used as optional examples, and are not limited, provided that the sound-emitting apparatus is located below the display module 201 and a sound emitted by the sound-emitting device can be guided to the earpiece hole group.

Figure 7:
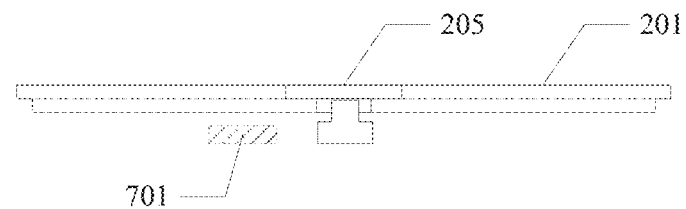
FIG. 7 is a schematic diagram of a partial cross-section structure of an embodiment of a terminal device according to the present invention.
Figure 8:
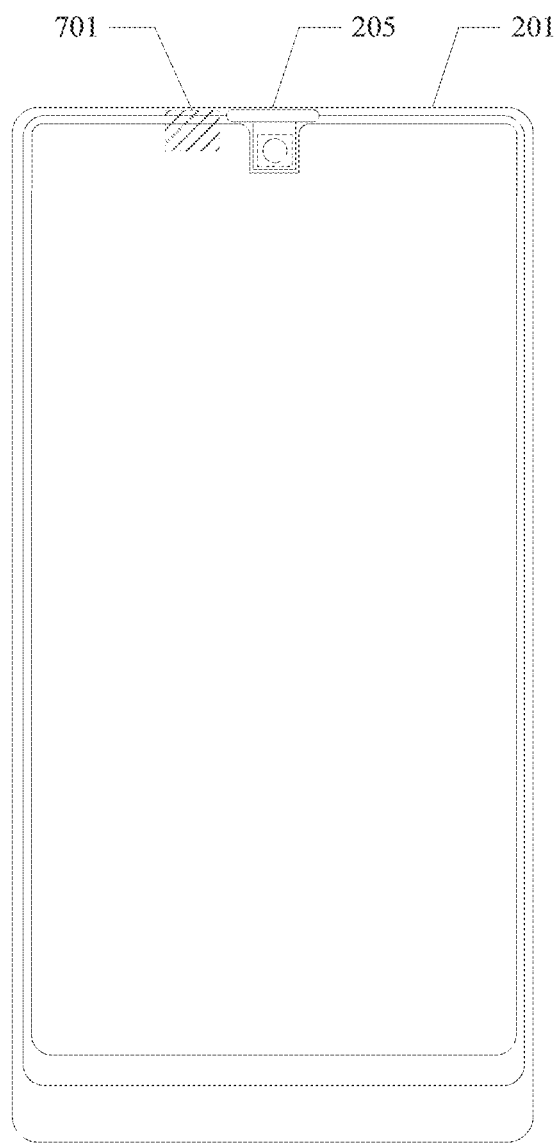
FIG. 8 is a schematic top view of a structure of another embodiment of a terminal device according to the present invention.

A first optional structure of the sound-emitting apparatus is as follows: With reference to FIG. 7 and FIG. 8, in this arrangement manner, in the direction perpendicular to the display module 201, an overlapping area between the sound-emitting apparatus 701 and the through-hole 205 is zero. In other words, in the direction perpendicular to the display module 201, the sound-emitting apparatus 701 and the through-hole 205 are arranged in a staggered manner. In addition, in this arrangement manner, in a transverse direction of the terminal device, the sound-emitting apparatus 701 and the camera 204 are arranged side by side.

Figure 9:
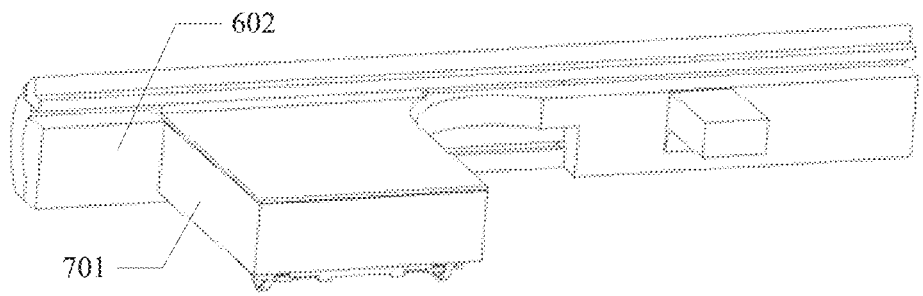
FIG. 9 is a schematic diagram of a partial structure of another embodiment of a terminal device according to the present invention.

For an overall structure of the sound-emitting apparatus 701, refer to FIG. 9. It can be learned, with reference to FIG. 6 and FIG. 9, that an end of the sound-emitting apparatus 701 is arranged to abut against a target edge 602 of the housing 200, and the target edge 602 is an edge, in which the through-hole 205 is arranged, of four edges included in the housing 200.

Figure 10:
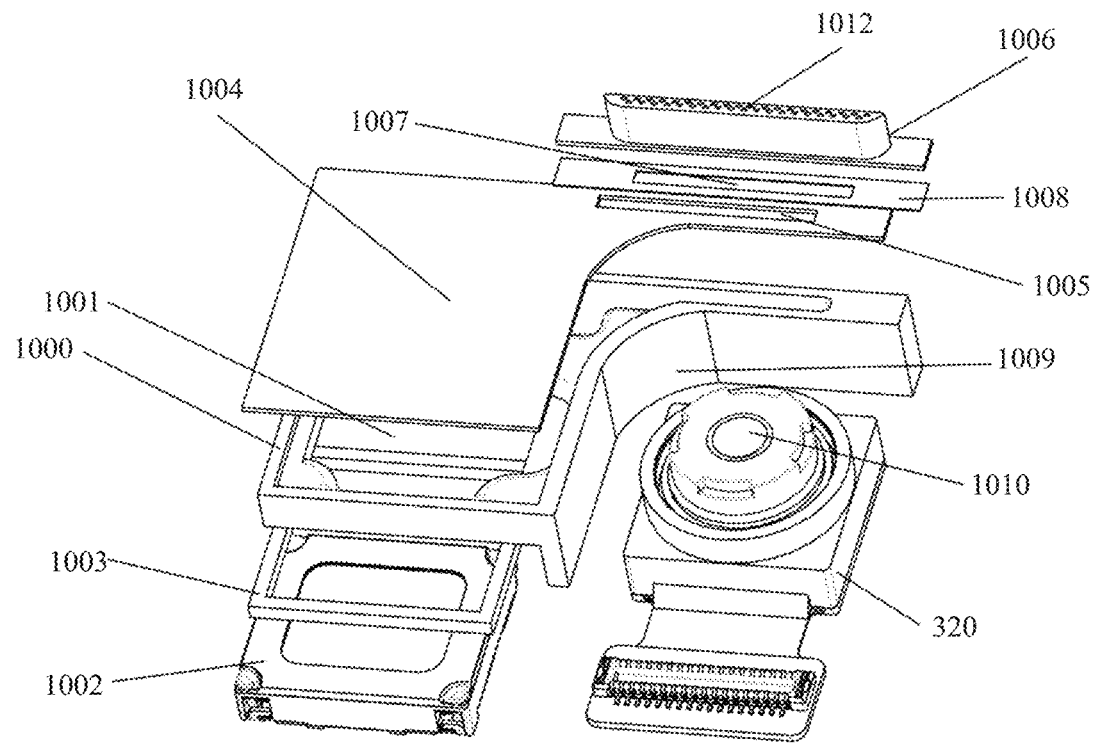
FIG. 10 is a schematic exploded diagram of a connection structure of an embodiment of a sound-emitting apparatus according to the present invention.

The following uses examples to describe an internal structure of the sound-emitting apparatus 701 with reference to FIG. 10.

The sound-emitting apparatus 701 includes a cavity body 1000, and a first accommodation cavity 1001 is arranged inside the cavity body 1000. For a structure of the cavity body 1000 and the first accommodation cavity 1001, refer to FIG. 11.

The first accommodation cavity 1001 is configured to accommodate a sound-emitting device 1002 for arrangement, and a sealing member 1003 is sleeved on the sound-emitting device 1002 and fastened between the first accommodation cavity 1001 and the sound-emitting device 1002. In other words, the sealing member 1003 may be arranged to be sleeved on an outer peripheral wall of the sound-emitting device 1002, so that when the sound-emitting device 1002 is inserted and fastened inside the first accommodation cavity 1001, an interference fit between the first accommodation cavity 1001 and the sound-emitting device 1002 is achieved by using the sealing member 1003, to prevent the sound-emitting device 1002 from being detached from the inside of the first accommodation cavity 1001, and effectively enhance stability of the structure of the sound-emitting apparatus 701.

Still as show in FIG. 10, an upper cover 1004 is arranged to cover a surface of the cavity body 1000. Specifically, in the direction perpendicular to the display module 201, a through slot 1005 is arranged at a position opposite to the upper cover 1004 and the through-hole 205, and the through slot 1005 is arranged to be connected to the inside of the cavity body 1000.

A sound-emitting member 1006 is arranged at a position opposite to the through slot 1005. In a direction perpendicular to the cavity body 1000, a sound guiding through-hole for guiding a sound is arranged to penetrate the sound-emitting member 1006 in this arrangement manner. An earpiece hole group 1012 is arranged on an end face, away from the cavity body 1000, of the sound guiding through-hole. The earpiece hole group 1012 is arranged to penetrate the through-hole 205 located in the target edge 602 of the housing 200, so that the earpiece hole group 1012 is exposed through the through-hole 205.

The sound guiding through-hole in this arrangement manner is arranged opposite to the through slot 1005, so that the sound guiding through-hole is arranged to be connected to the through slot 1005, and the sound-emitting member 1006 can guide, to the earpiece hole group 1012, a sound guided by the sound-emitting apparatus 701.

A second accommodation concave cavity 1009 is arranged to be recessed in an outer peripheral wall of the cavity body 1000 in this arrangement manner, and the second accommodation concave cavity 1009 is configured to insert and fasten the camera module 320, so that a camera 1010 of the camera module 320 is exposed.

To ensure that the sound guided by the sound-emitting apparatus 701 does not leak, a sealing gum member 1008 is arranged between the through slot 1005 and the sound-emitting member 1006.

A specific material of the sealing gum member 1008 is not limited in this arrangement manner, provided that the sealing gum member 1008 has an adhesive effect. Specifically, a through-hole 1007 of the sealing gum member 1008 is arranged to separately fit shapes of the through slot 1005 and the sound guiding through-hole, so that the sound-emitting member 1006 is bonded on a first side of the sealing gum member 1008, and the sound-emitting apparatus 701 is bonded on a second side of the sealing gum member 1008, thereby bonding and fastening the sound-emitting member 1006 on the sound-emitting apparatus 701. In this way, the through slot 1005 is connected to the sound guiding through-hole through the through-hole 1007 of the sealing gum member 1008, and further a sound emitted by the sound-emitting member 1006 is guided to the earpiece hole group 1012 sequentially through at least one sound cavity included in the sound-emitting apparatus 701, the through slot 1005, the through-hole 1007, and the sound guiding through-hole.

The sealing gum member 1008 is arranged in this arrangement manner, effectively preventing the sound guided by the sound-emitting apparatus 701 from leaking to the inside of the terminal device due to insecure connection between the sound-emitting member 1006 and the upper cover 1004, and implementing an effect that the sound guided by the sound-emitting apparatus 701 is sealed by using the sealing gum member 1008.

The following describes, with reference to the accompanying drawings, a specific structure of a sound cavity inside the sound-emitting apparatus 701 in this arrangement manner. It should be made clear that description of the structure of the sound cavity in this arrangement manner is an optional example and is not limited, provided that a sound emitted by the sound-emitting device can be guided to the through slot 1005 through the sound cavity.

Figure 11:
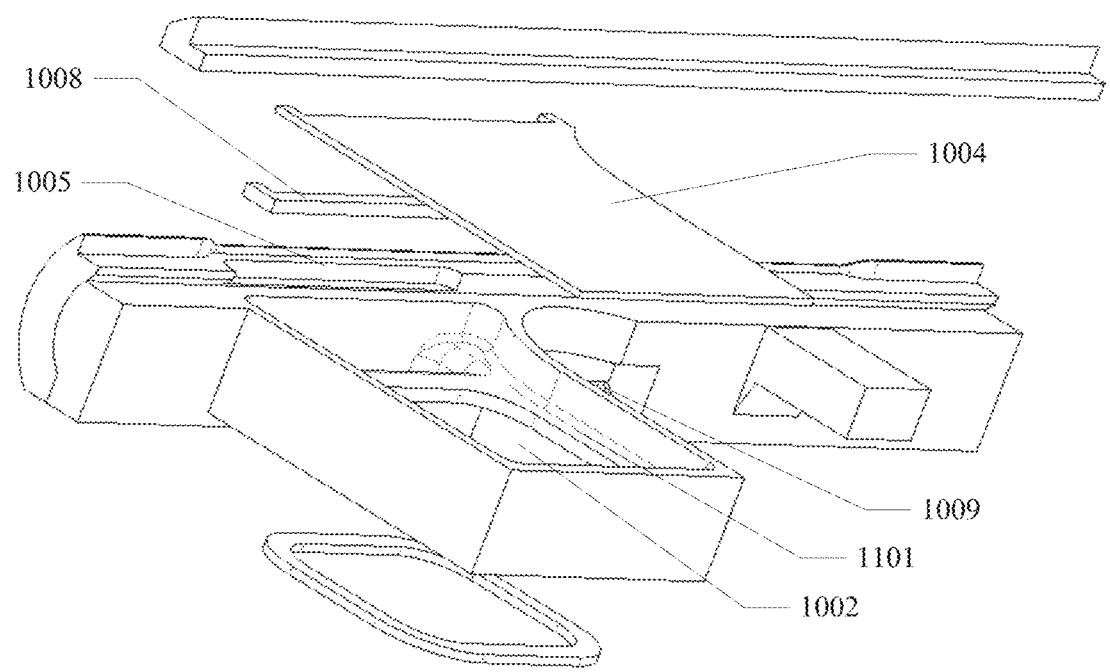
FIG. 11 is a schematic exploded diagram of a connection structure of another embodiment of a sound-emitting apparatus according to the present invention.
Figure 12:
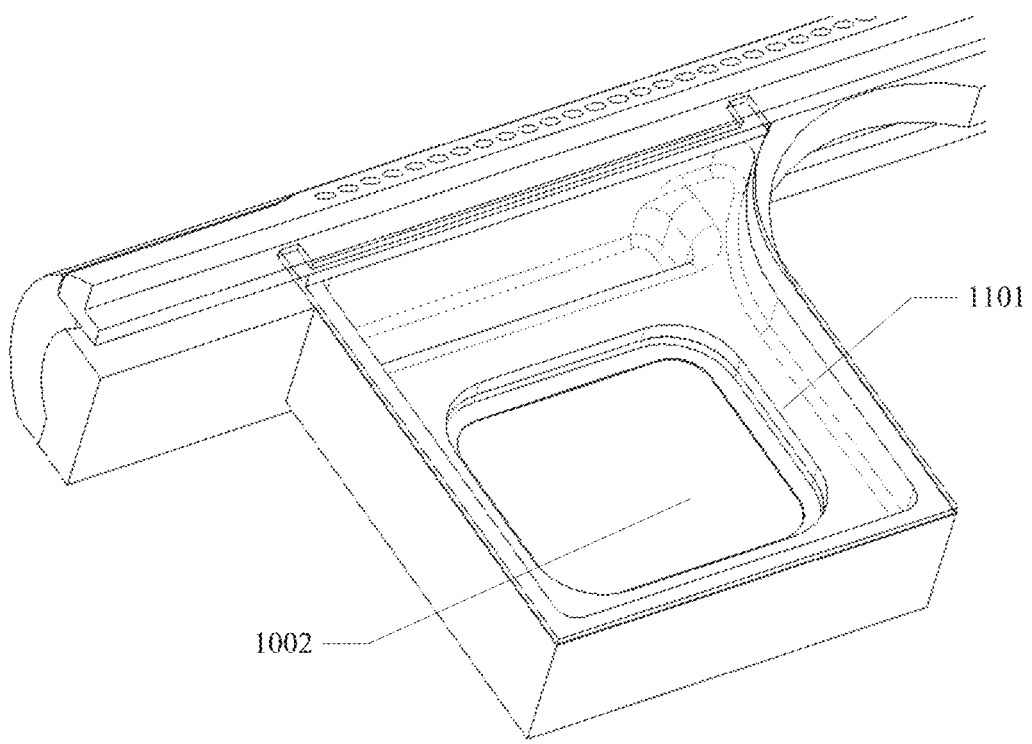
FIG. 12 is a schematic diagram of a partial structure of an embodiment of a sound-emitting apparatus according to the present invention.
Figure 13:
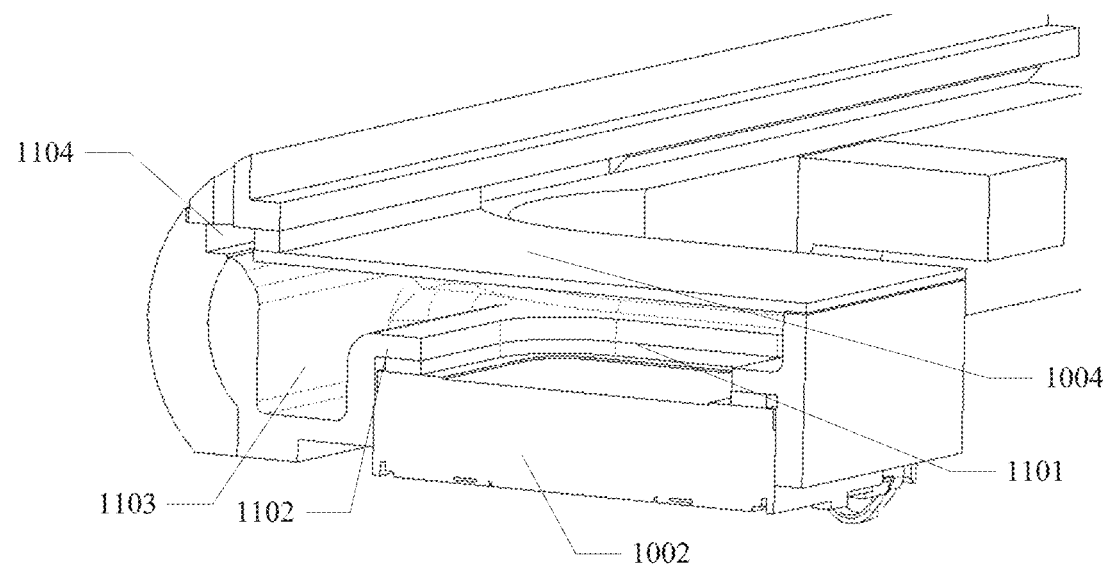
FIG. 13 is a schematic diagram of a cross-section structure of an embodiment of a sound-emitting apparatus according to the present invention.

First, refer to FIG. 11 to FIG. 13. FIG. 11 is a schematic exploded diagram of a connection structure of a sound-emitting apparatus. FIG. 12 is a schematic top view of an internal structure of a sound-emitting apparatus, that is, FIG. 12 is a schematic top view of a structure after the upper cover 1004 is removed from the sound-emitting apparatus. FIG. 13 is a side cutaway drawing of the sound-emitting apparatus.

In this arrangement manner, a first sound cavity 1101 is formed between the sound-emitting device 1002 and the upper cover 1004.

Figure 14:
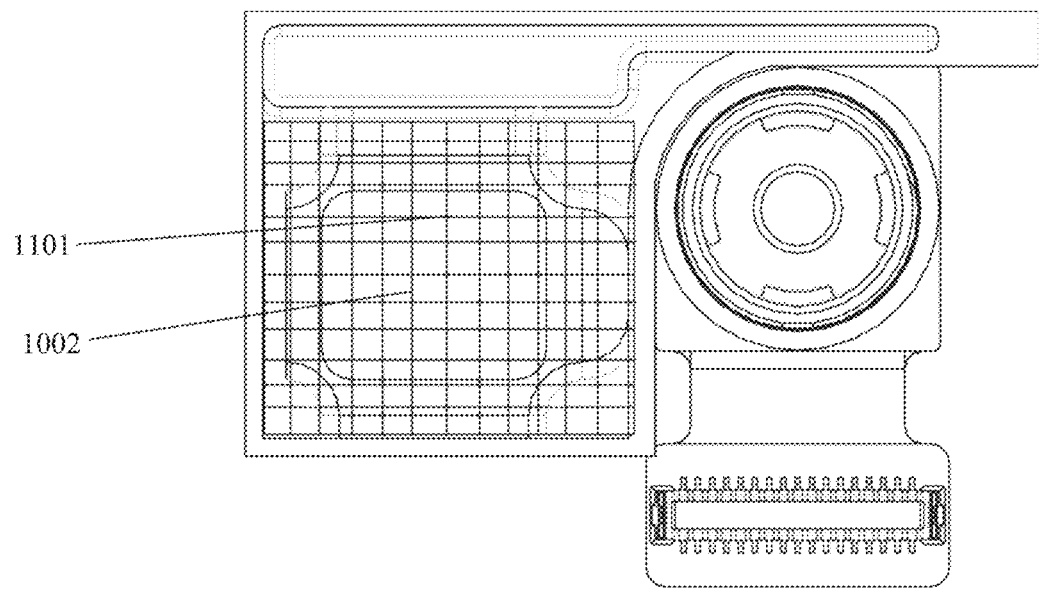
FIG. 14 is a schematic diagram of a cross-section structure of an embodiment of a sound-emitting apparatus according to the present invention.

To better describe a structure of the first sound cavity 1101 in this arrangement manner, the following gives a description by using an example with reference to FIG. 14. FIG. 14 is a schematic top view of a structure of the sound-emitting apparatus in which the first sound cavity 1101 is arranged.

With reference to FIG. 13 and FIG. 14, it can be learned that the first sound cavity 1101 is arranged exactly above the sound-emitting device 1002.

The first sound cavity 1101 in this arrangement manner can guide a sound emitted by the sound-emitting device 1002. To guide the sound emitted by the sound-emitting device 1101 to the through slot 1005, still referring to FIG. 13, a holding arm 1102 is formed on a peripheral wall of the first accommodation cavity 1001 in this arrangement manner in an extension direction away from the sound-emitting device 1002, and the holding arm 1102 is configured to hold and fasten the sound-emitting device 1002 inside the first accommodation cavity 1001.

A third sound cavity 1103 is formed to be recessed between the holding arm 1102 and the top of the sound-emitting apparatus.

Figure 15:
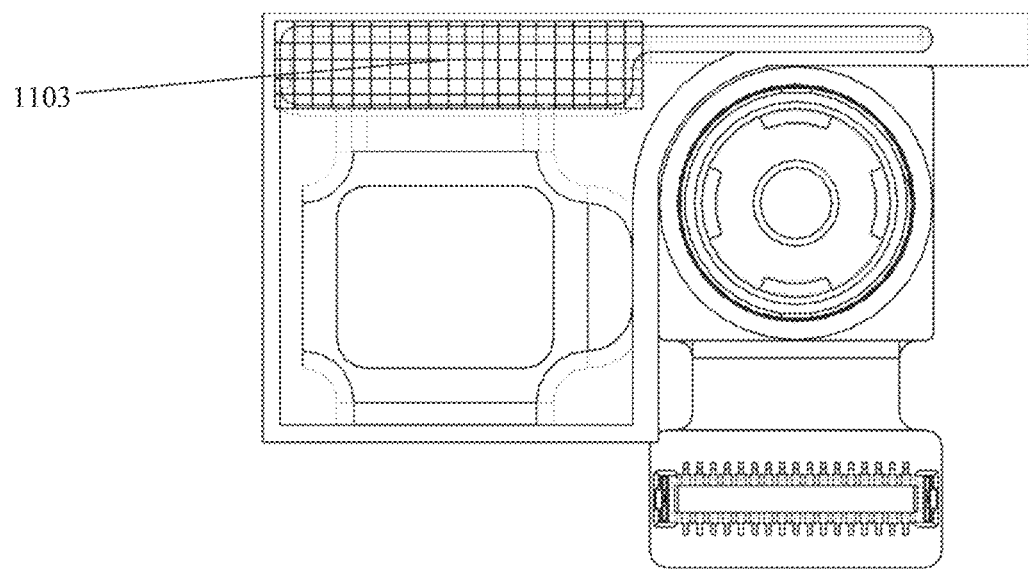
FIG. 15 is a schematic diagram of a cross-section structure of another embodiment of a sound-emitting apparatus according to the present invention.

For a structure of the third sound cavity 1103, refer to FIG. 15. FIG. 15 is a schematic top view of a structure of the sound-emitting apparatus in which the first sound cavity 1101 and the third sound cavity 1103 are arranged.

It can be learned, with reference to FIG. 13 and FIG. 15, that the first sound cavity 1101 and the third sound cavity 1103 in this arrangement manner are connected to each other through a gap between the holding arm 1102 and the upper cover 1004.

The first sound cavity 1101 in this arrangement manner guides, to the inside of the third sound cavity 1103, the sound emitted by the sound-emitting device 1002.

Figure 16:
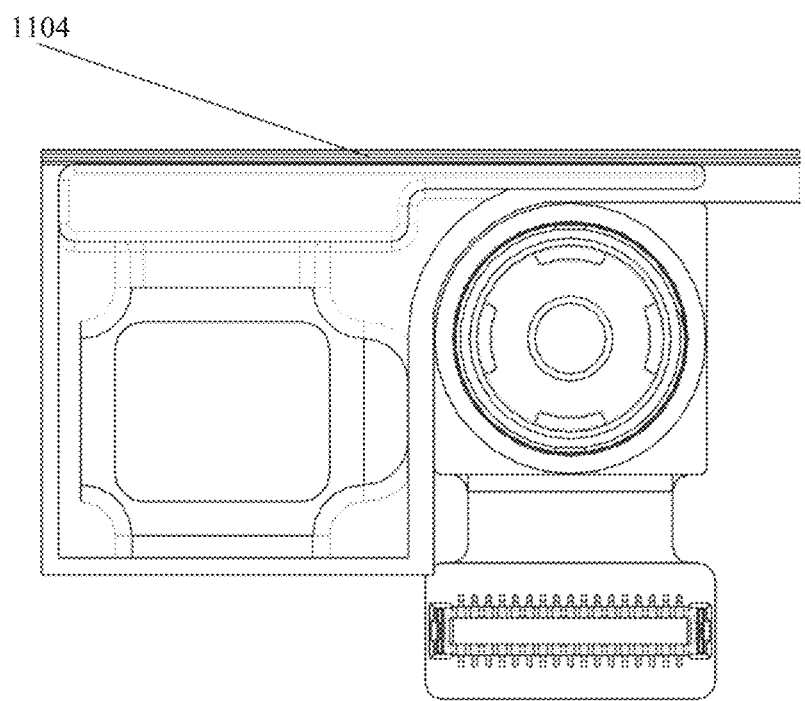
FIG. 16 is a schematic diagram of a cross-section structure of another embodiment of a sound-emitting apparatus according to the present invention.

With reference to FIG. 13 and FIG. 16, a second sound cavity 1104 is arranged at the top of the sound-emitting apparatus in this arrangement manner. In the direction perpendicular to the display module, the second sound cavity 1104 is arranged opposite to the earpiece hole group 1012, so that the second sound cavity 1104 and the earpiece hole group 1012 are arranged to be connected to each other, and the second sound cavity 1104 can guide a sound to the earpiece hole group 1012.

The following describes flow directions of a sound inside the sound-emitting apparatus with reference to FIG. 13 to FIG. 16.

First, a sound emitted by the sound-emitting device 1002 is guided to the first sound cavity 1101.

Next, the first sound cavity 1101 guides, to the third sound cavity 1103 that is connected to the first sound cavity 1101, the sound that is guided to the inside of the first sound cavity 1101.

Then, the third sound cavity 1103 guides, to the second sound cavity 1104 that is connected to the third sound cavity 1103, the sound that is guided to the inside of the third sound cavity 1103.

Finally, the second sound cavity 1104 guides, to the earpiece hole group 1012 sequentially through the through slot 1005, the through-hole 1007, and the sound guiding through-hole, the sound that is guided to the inside of the second sound cavity 1104.

It can be learned that, according to the sound-emitting apparatus in this arrangement manner, the sound emitted by the sound-emitting device 1002 can be guided to the earpiece hole group 1012, so that the user can hear, through the earpiece hole group 1012, the sound dissipated by the earpiece hole group 1012.

Moreover, a thickness of a cavity wall of each sound cavity in this embodiment may be any value from 0.01 mm to 1 mm (including 0.01 mm and 1 mm) and angle positions of each sound cavity may be chamfered in this embodiment, so that a sound path formed by connecting sound cavities inside the sound-emitting apparatus in this embodiment is smoother, effectively reducing reflection or the like that may occur when a sound circulates in the sound path, and improving an effect and smoothness of a sound dissipated through the through-hole.

Beneficial effects of using this arrangement manner lie in that, because the sound-emitting apparatus is arranged below the display module of the terminal device, that is, the sound-emitting apparatus does not occupy the area of the display module, the sound-emitting apparatus does not affect the screen-to-body ratio of the terminal device, thereby effectively increasing the screen-to-body ratio of the terminal device. In addition, the sound-emitting apparatus may be arranged in an integrated manner; therefore, in a process of assembling the terminal device, the sound-emitting apparatus may be installed as a whole inside the terminal device, effectively improving assembly efficiency of the terminal device and stability of the structure of the terminal device. The sound-emitting apparatus is arranged below the display module in this arrangement, so that a device needing to have a light transmission requirement is arranged on the panel of the terminal device, thereby improving utilization efficiency of the panel of the terminal device.

Moreover, within limited space inside the sound-emitting apparatus, a plurality of sound cavities inside the sound-emitting apparatus can guide, to a through-hole located in the terminal device, a sound emitted by the sound-emitting device, to effectively improve an effect of guiding a sound from the sound-emitting device, and ensure an effect of a sound dissipated from the through-hole.

A second optional structure of the sound-emitting apparatus is as follows: A difference of the second structure of the sound-emitting apparatus from the first structure of the sound-emitting apparatus described above lies in that, as shown in FIG. 17, inside the sound-emitting apparatus, a fourth sound cavity 1701 is arranged to be connected to the first sound cavity 1101. Specifically, the second accommodation concave cavity 1009 is formed in an outer peripheral wall of the fourth sound cavity 1701, to fasten the camera 1010.

For detailed description of the first sound cavity 1101, the second sound cavity 1104, and the third sound cavity 1103 in this arrangement manner, refer to description of the first structure of the sound-emitting apparatus described above. Details are not described again.

Figure 17:
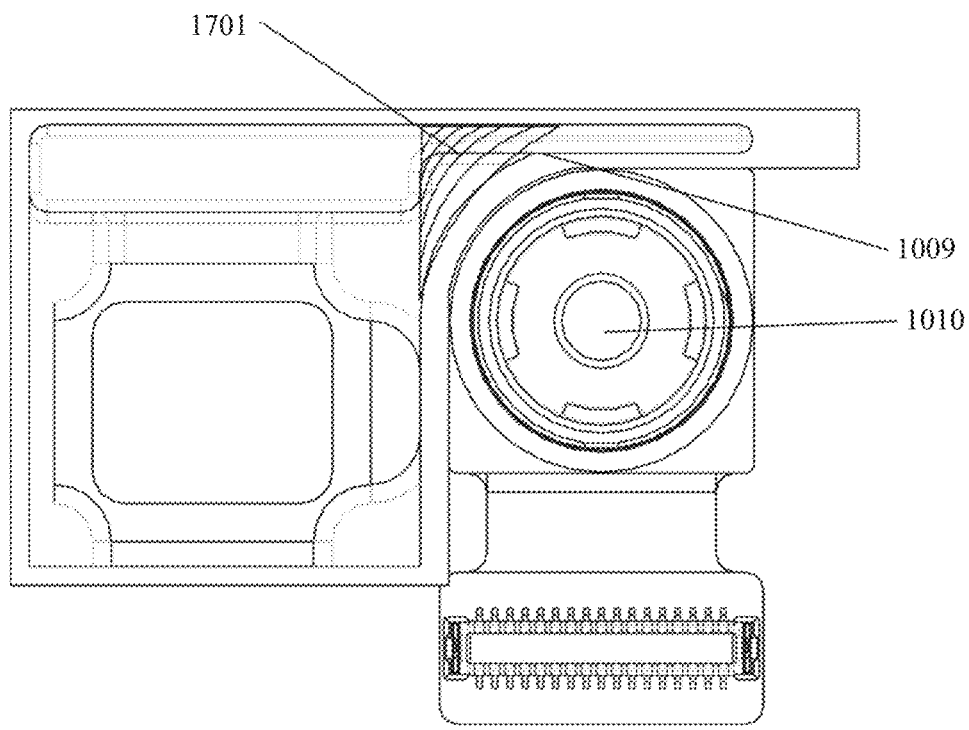
FIG. 17 is a schematic diagram of a cross-section structure of another embodiment of a sound-emitting apparatus according to the present invention.

The following describes flow directions of a sound inside the sound-emitting apparatus with reference to FIG. 17.

First, a sound emitted by the sound-emitting device 1002 is guided to the first sound cavity 1101. Next, the first sound cavity 1101 guides, to both the third sound cavity 1103 and the fourth sound cavity 1701 that are connected to the first sound cavity 1101, the sound that is guided to the inside of the first sound cavity 1101. Then, the third sound cavity 1103 and the fourth sound cavity 1701 guide the sound to the second sound cavity 1104. Finally, the second sound cavity 1104 guides, to the earpiece hole group 1012 sequentially through the through slot 1005, the through-hole 1007, and the sound guiding through-hole, the sound that is guided to the inside of the second sound cavity 1104.

It can be learned that, according to the sound-emitting apparatus in this arrangement manner, the sound emitted by the sound-emitting device 1002 can be guided to the earpiece hole group 1012, so that the user can hear, through the earpiece hole group 1012, the sound dissipated by the earpiece hole group 1012.

Figure 18:
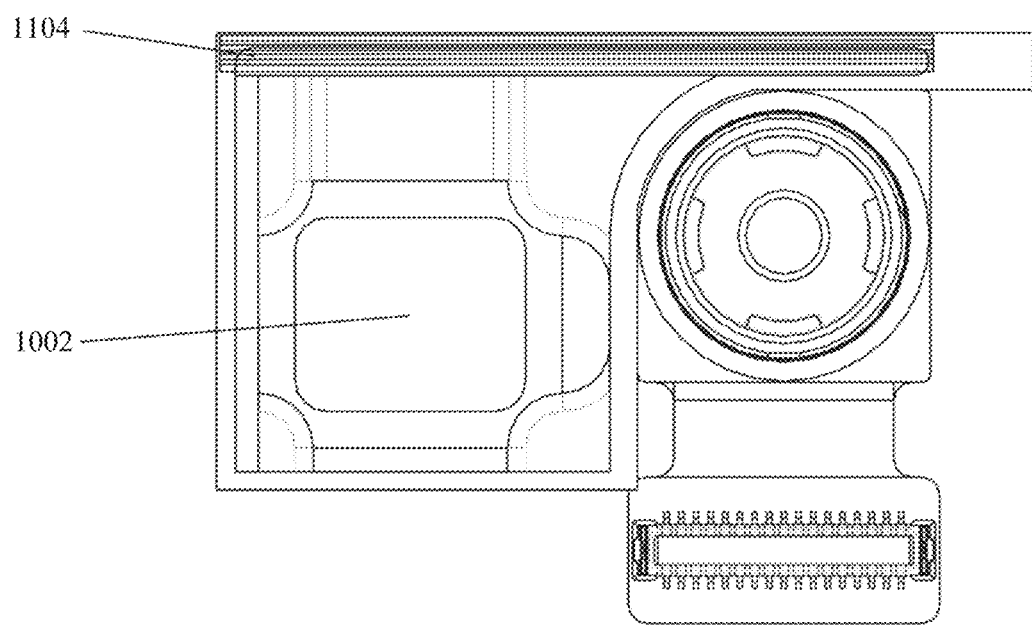
FIG. 18 is a schematic diagram of a cross-section structure of another embodiment of a sound-emitting apparatus according to the present invention.

A third optional structure of the sound-emitting apparatus is as follows: For a structure of the sound-emitting apparatus in this embodiment, reference may be made to FIG. 18. A difference of the third structure of the sound-emitting apparatus from the first structure of the sound-emitting apparatus described above lies in that, as shown in FIG. 18, to reduce a volume of the sound-emitting apparatus, the third sound cavity 1103 is not arranged in this arrangement manner as compared with the first structure of the sound-emitting apparatus. In other words, in this arrangement manner, the first sound cavity 1101 is directly connected to the second sound cavity 1104.

For detailed description of the first sound cavity 1101, the second sound cavity 1104, and the third sound cavity 1103, refer to description of the first structure of the sound-emitting apparatus described above. Details are not described again.

The following describes flow directions of a sound inside the sound-emitting apparatus: First, a sound emitted by the sound-emitting device 1002 is guided to the first sound cavity 1101. Next, the first sound cavity 1101 guides, to the second sound cavity 1104 that is connected to the first sound cavity 1101, the sound that is guided to the inside of the first sound cavity 1101. Finally, the second sound cavity 1104 guides, to the earpiece hole group 1012 sequentially through the through slot 1005, the through-hole 1007, and the sound guiding through-hole, the sound that is guided to the inside of the second sound cavity 1104.

Figure 19:
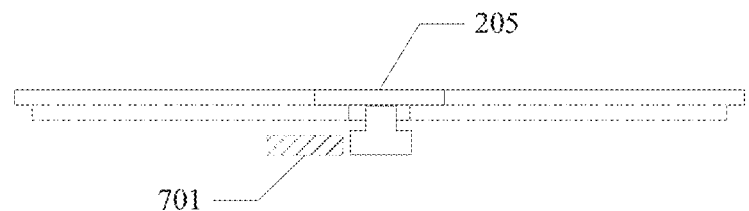
FIG. 19 is a schematic diagram of a partial cross-section structure of another embodiment of a terminal device according to the present invention.
Figure 20:
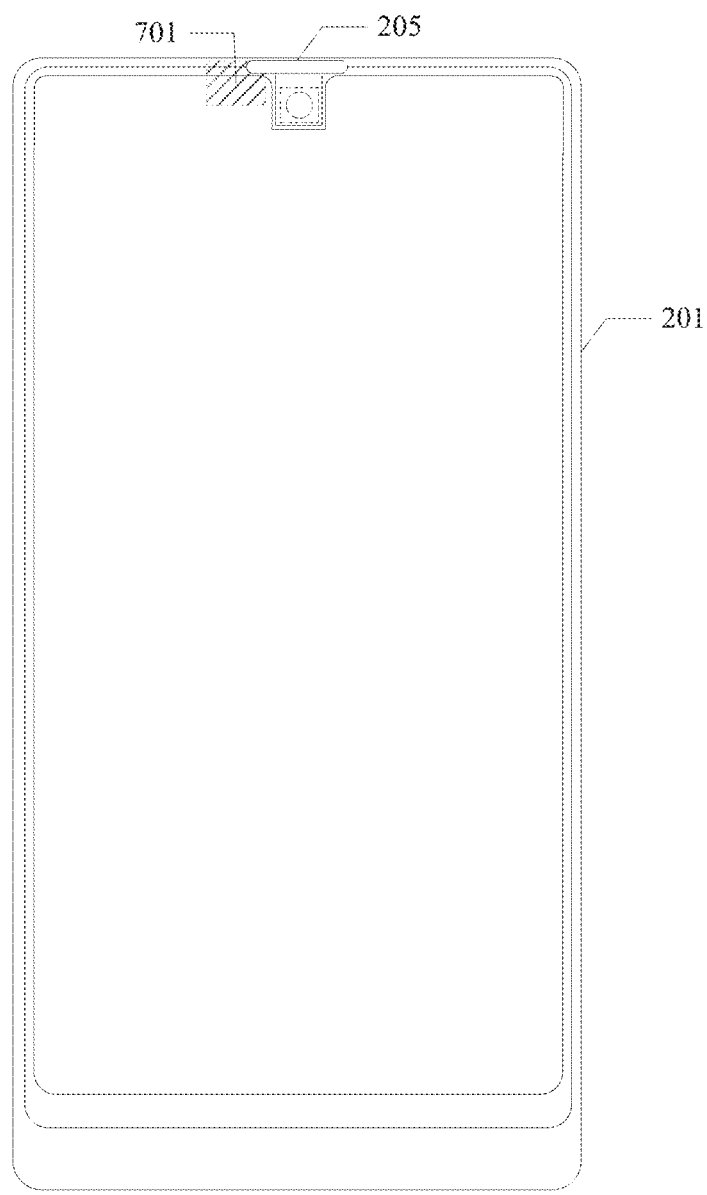
FIG. 20 is a schematic top view of a structure of another embodiment of a terminal device according to the present invention.

A fourth optional structure of the sound-emitting apparatus is as follows: For a specific structure of the sound-emitting apparatus in this arrangement manner, reference may be made to any structure described above. Details are not described again. A difference of the fourth structure of the sound-emitting apparatus from the first structure of the sound-emitting apparatus described above lies in that the sound-emitting apparatus is arranged at a different position. As shown in FIG. 19 and FIG. 20, in the direction perpendicular to the display module 201, an overlapping area between the sound-emitting apparatus 701 and the through-hole 205 in this arrangement manner is greater than zero. In other words, in the direction perpendicular to the display module 201, the sound-emitting apparatus 701 and the through-hole 205 at least partially overlap.

A size of the overlapping area between the sound-emitting apparatus 701 and the through-hole 205 is not limited in this arrangement manner.

For a structure of internal sound cavities of the sound-emitting apparatus 701 in this arrangement manner, reference may be made to any structure described above, and details are not described again, provided that the sound cavities included in the sound-emitting apparatus 701 can guide, to the through-hole 205, a sound emitted by the sound-emitting device.

Figure 21:
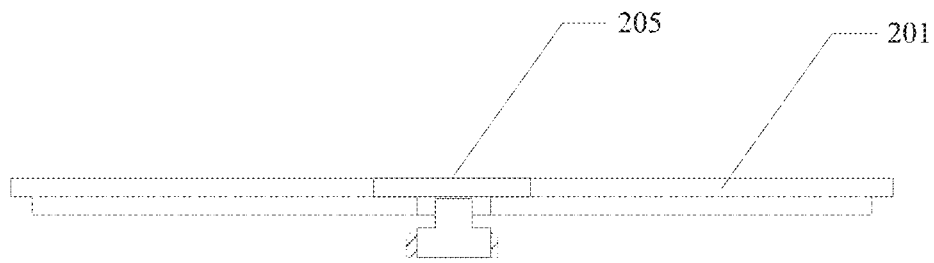
FIG. 21 is a schematic diagram of a partial cross-section structure of another embodiment of a terminal device according to the present invention.
Figure 22:
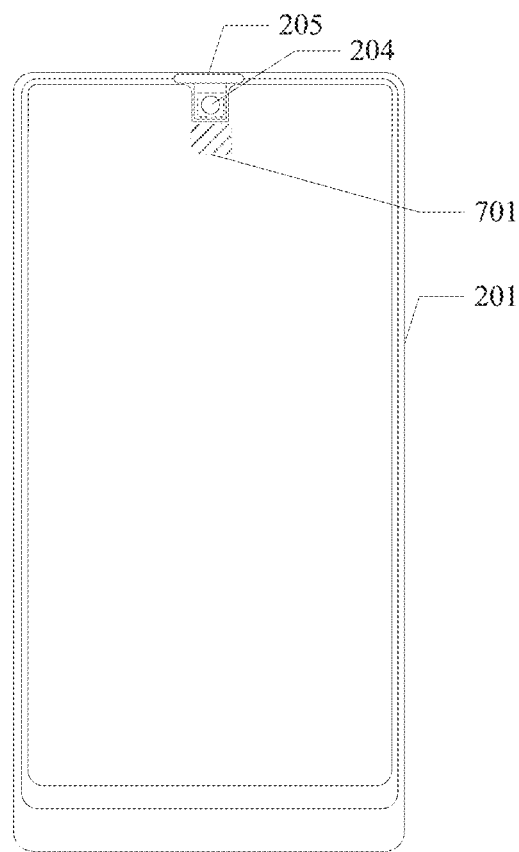
FIG. 22 is a schematic top view of a structure of another embodiment of a terminal device according to the present invention.

A fifth optional structure of the sound-emitting apparatus is as follows: As shown in FIG. 21 and FIG. 22, in the direction perpendicular to the display module 201, the sound-emitting apparatus 701 and the through-hole 205 are arranged in a staggered manner. In other words, in the direction perpendicular to the display module 201, an overlapping area between the sound-emitting apparatus 701 and the through-hole 205 is zero. In a transverse direction of the terminal device, the sound-emitting apparatus 701 and the camera 204 are arranged side by side.

A specific structure of the sound cavities included in the sound-emitting apparatus 701 is not limited in this arrangement manner, provided that the sound cavities can guide, to the through-hole 205, a sound emitted by the sound-emitting device.

Figure 23:
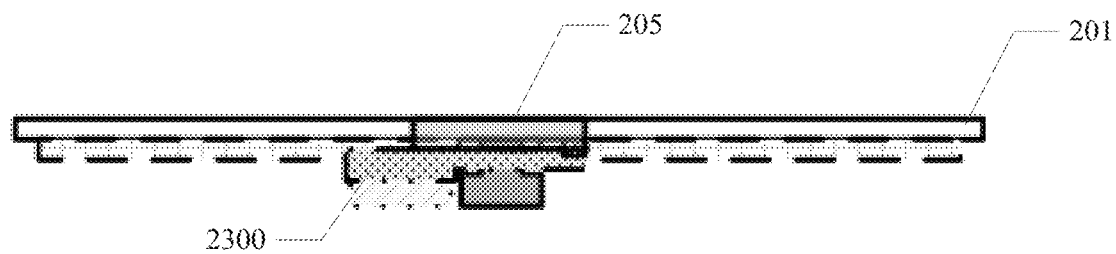
FIG. 23 is a schematic diagram of a partial cross-section structure of another embodiment of a terminal device according to the present invention.
Figure 24:
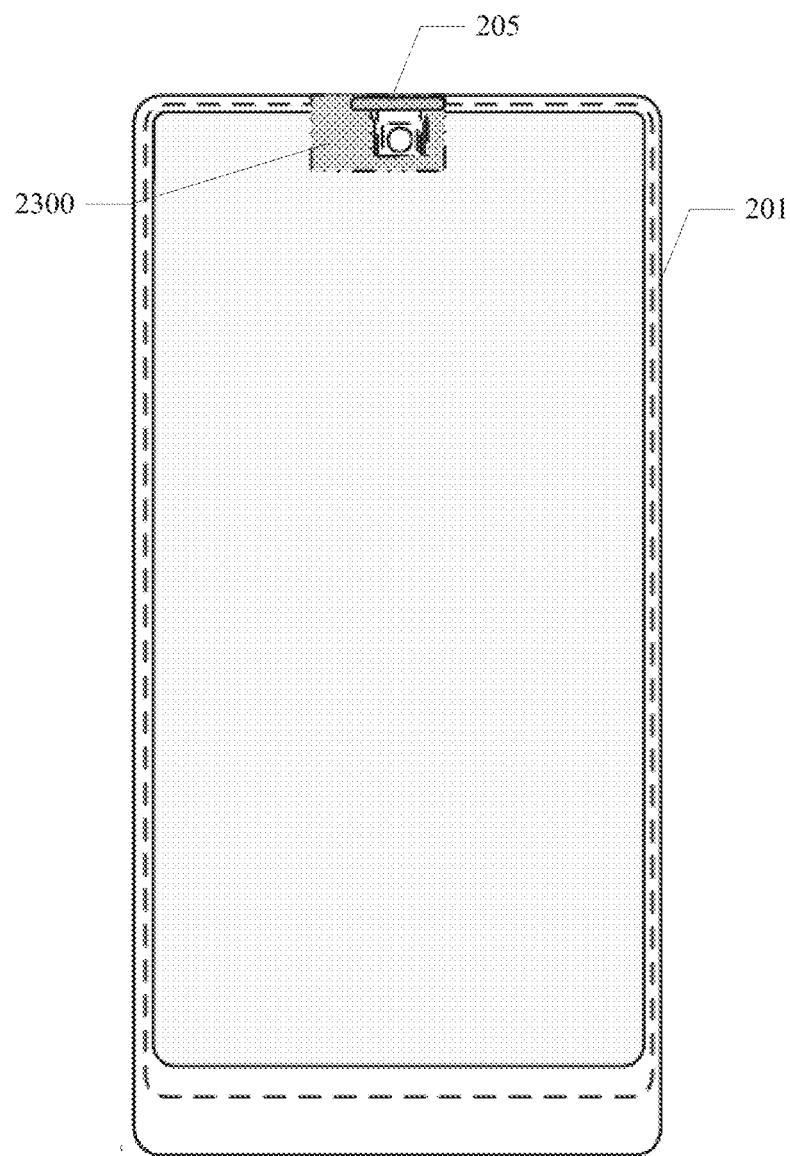
FIG. 24 is a schematic top view of a structure of another embodiment of a terminal device according to the present invention.

A sixth optional structure of the sound-emitting apparatus is as follows: In this arrangement manner, with reference to FIG. 23 and FIG. 24, in the direction perpendicular to the display module 201, an overlapping area between a sound-emitting apparatus 2300 and the through-hole 205 is greater than zero. In other words, in the direction perpendicular to the display module 201, the sound-emitting apparatus 2300 and the through-hole 205 at least partially overlap.

A sound-emitting device and a camera are arranged inside the sound-emitting apparatus 2300.

Figure 25:
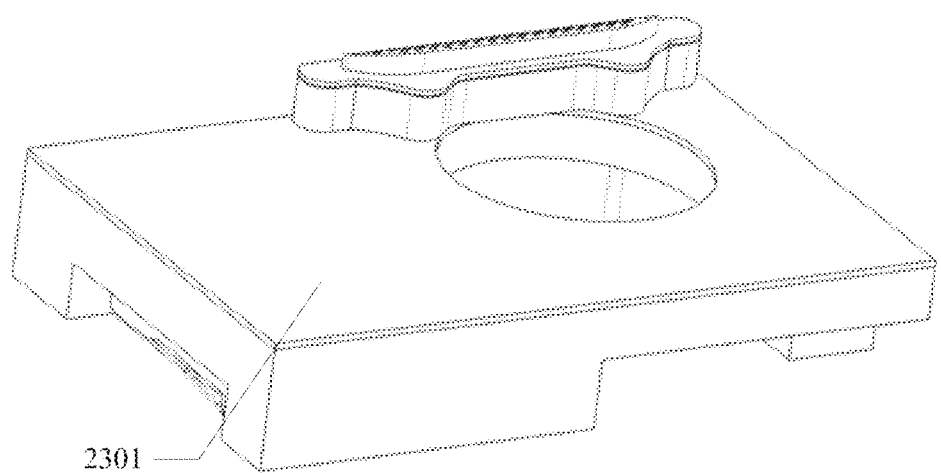
FIG. 25 is a schematic diagram of an overall structure of an embodiment of a sound-emitting apparatus according to the present invention.
Figure 26:
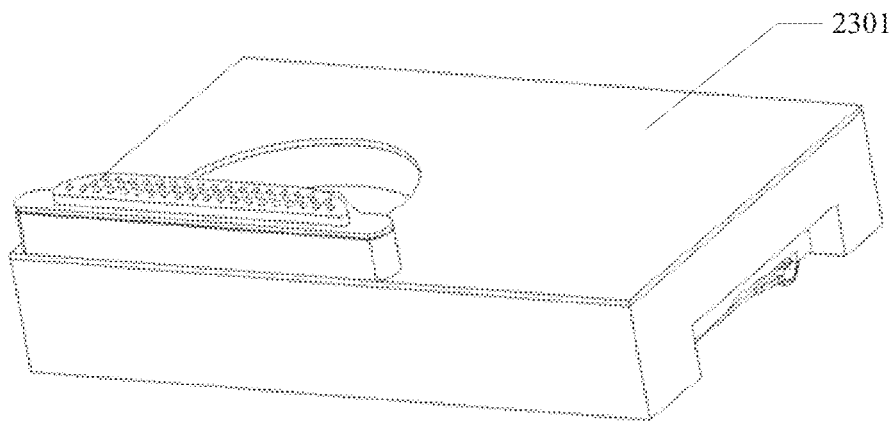
FIG. 26 is a schematic diagram of an overall structure of another embodiment of a sound-emitting apparatus according to the present invention.
Figure 27:
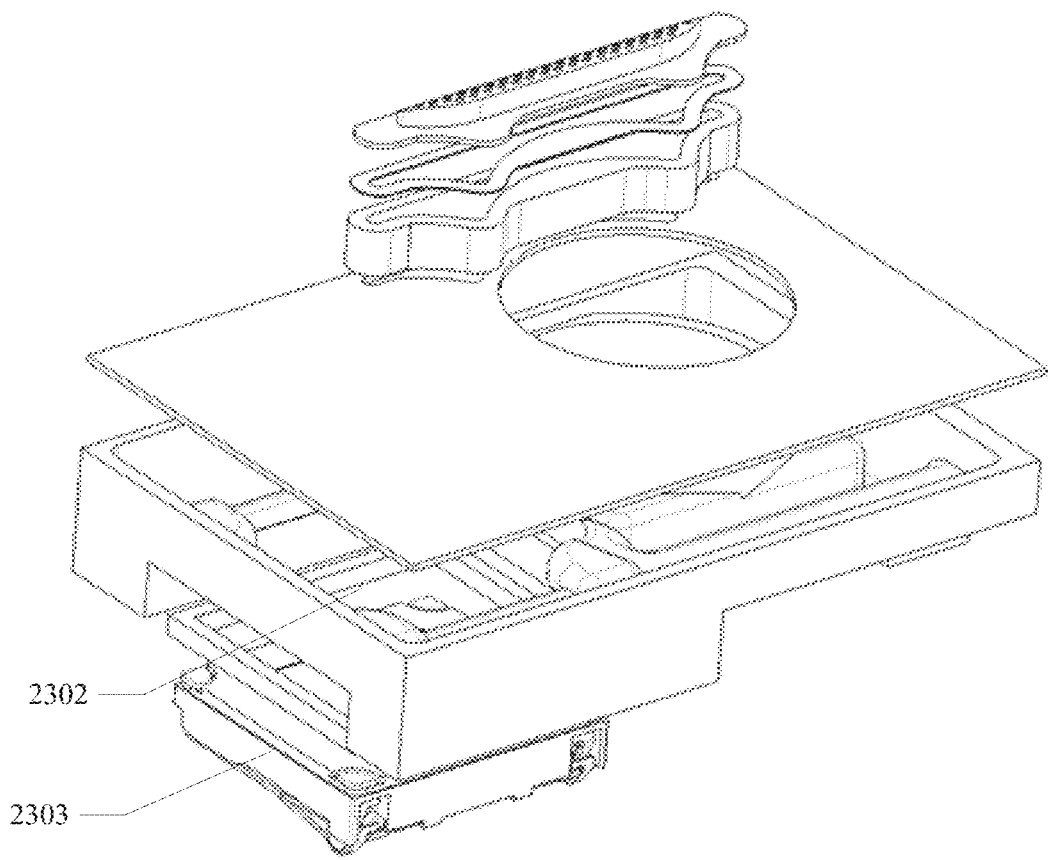
FIG. 27 is a schematic exploded diagram of a connection structure of another embodiment of a sound-emitting apparatus according to the present invention.
Figure 28:
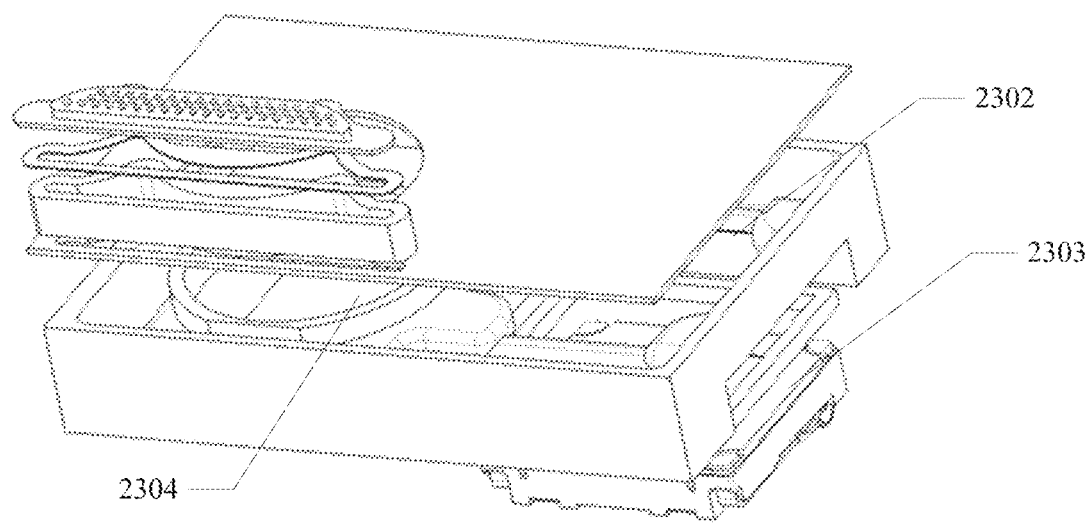
FIG. 28 is a schematic exploded diagram of a connection structure of another embodiment of a sound-emitting apparatus according to the present invention.
Figure 29:
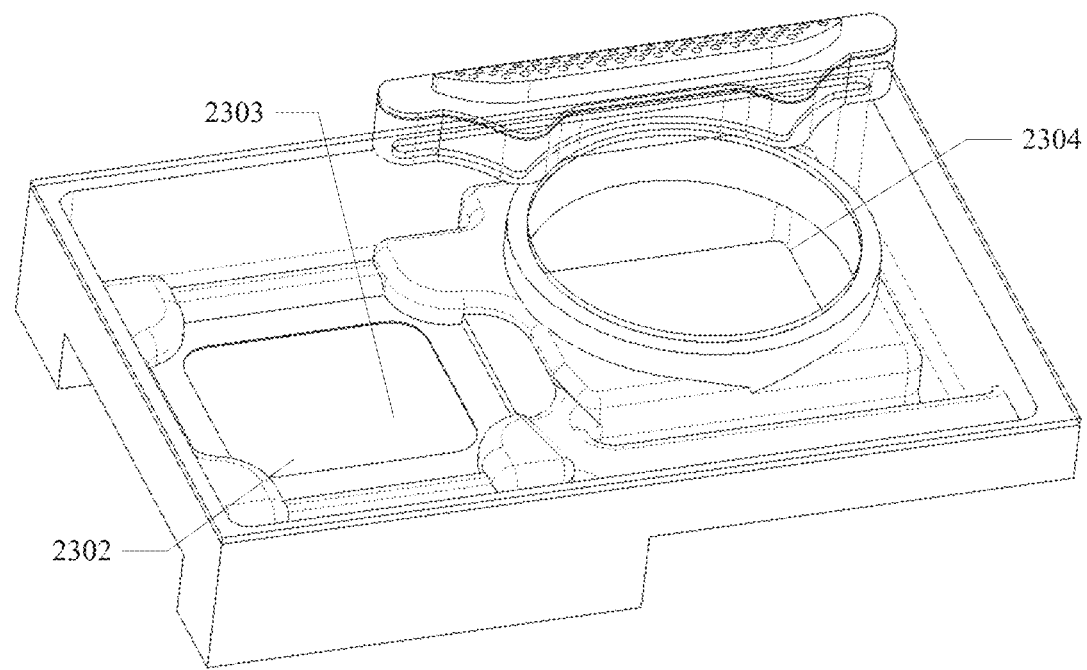
FIG. 29 is a schematic diagram of a partial structure of an embodiment of a sound-emitting apparatus according to the present invention.

Specifically, for an overall structure of the sound-emitting apparatus shown in this structure, reference may be made to FIG. 25 and FIG. 26. The sound-emitting apparatus includes a cavity body 2301. For an internal structure of the cavity body 2301, reference may be made to FIG. 27 to FIG. 29. A first accommodation cavity 2302 is included inside the cavity body 2301, and the first accommodation cavity 2302 is configured to accommodate a sound-emitting device 2303 for arrangement. For detailed description of how to arrange the sound-emitting device 2303 in the first accommodation cavity 2302, reference may also be made to description of the first arrangement manner of the sound-emitting apparatus. Details are not described again in this arrangement manner.

Figure 30:
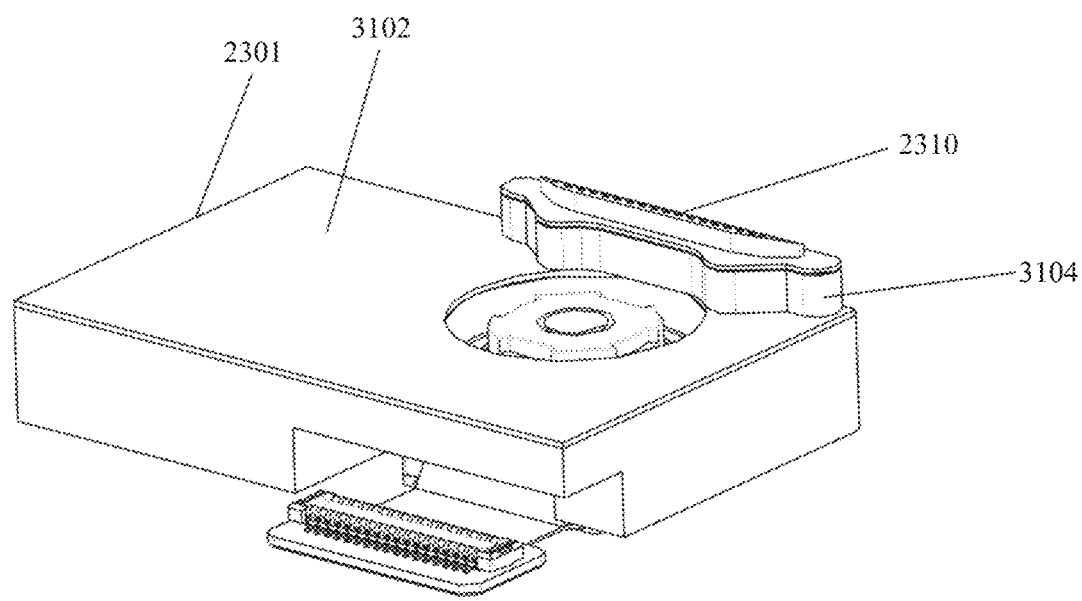
FIG. 30 is a schematic diagram of an overall structure of another embodiment of a sound-emitting apparatus according to the present invention.
Figure 31:
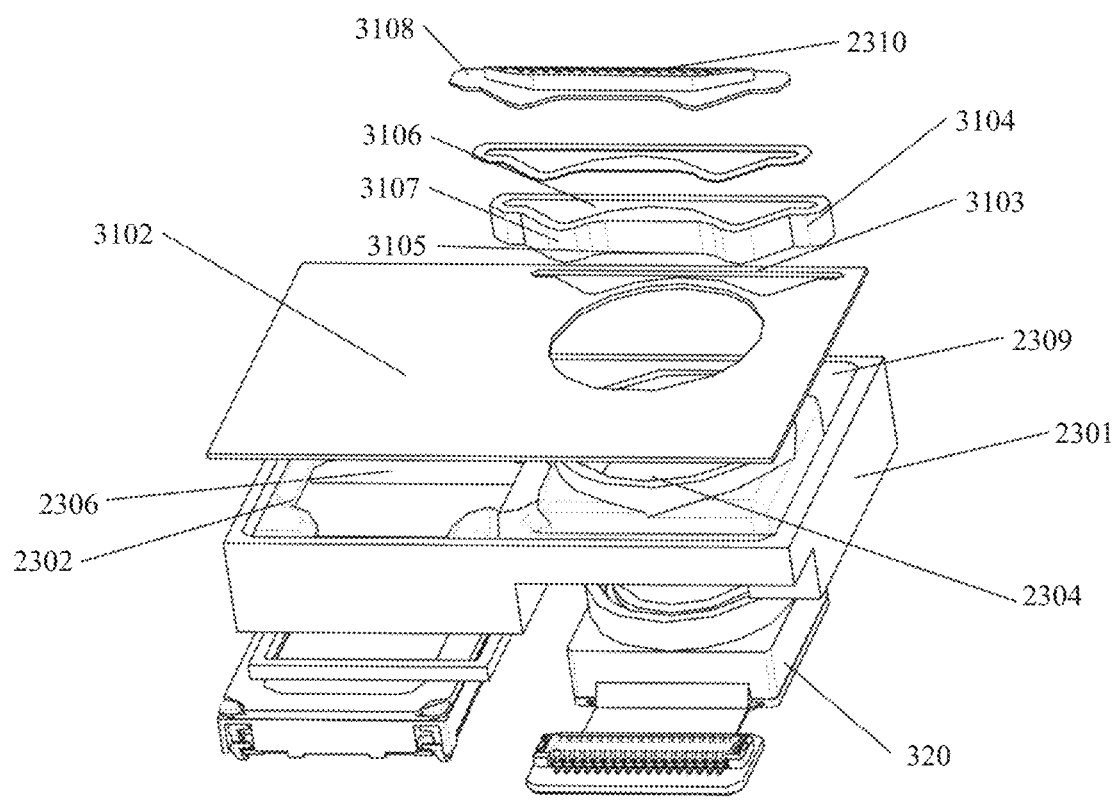
FIG. 31 is a schematic exploded diagram of a connection structure of another embodiment of a sound-emitting apparatus according to the present invention.

Still with reference to FIG. 30 and FIG. 31, in this arrangement manner, a third accommodation cavity 2304 is further arranged inside the cavity body 2301, and in a transverse direction of the terminal device, the first accommodation cavity 2302 and the third accommodation cavity 2304 are arranged side by side. The third accommodation cavity 2304 in this arrangement manner is configured to insert and fasten the camera module 320.

Figure 32:
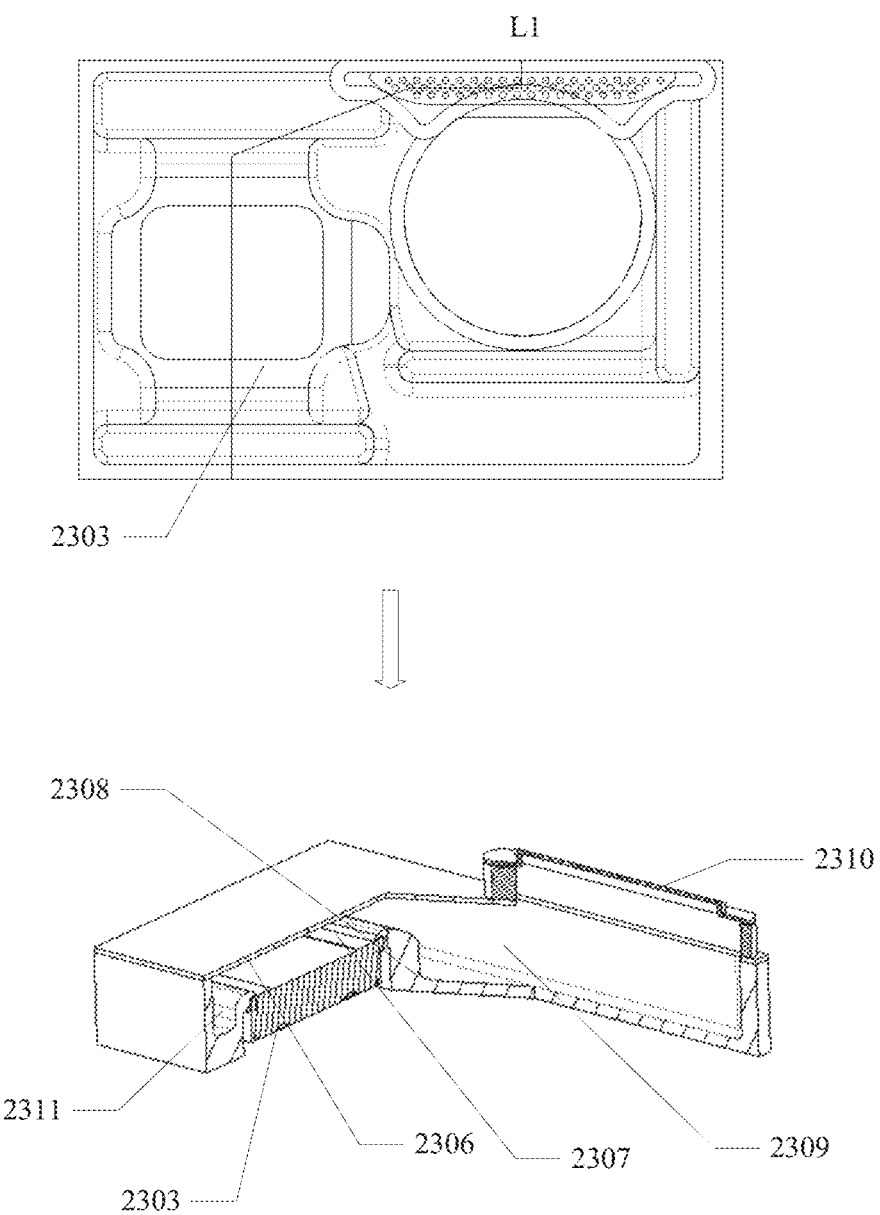
FIG. 32 is a schematic structural diagram of an embodiment of a sound-emitting apparatus according to the present invention.

The following uses examples to describe a structure of sound cavities included inside the sound-emitting apparatus 2300 provided in this arrangement manner: Specifically, referring to FIG. 32 to FIG. 34, a structural diagram shown on the left side of FIG. 32 is sectioned by a cross section line L1 to form a structural diagram shown on the right side of FIG. 32. FIG. 34 is a structural diagram formed by sectioning a structural diagram shown in FIG. 33 by a cross section line L2.

A first sound cavity 2306 is formed between the cavity body 2301 and a position exactly above the sound-emitting device 2303 in this arrangement manner.

Figure 35:
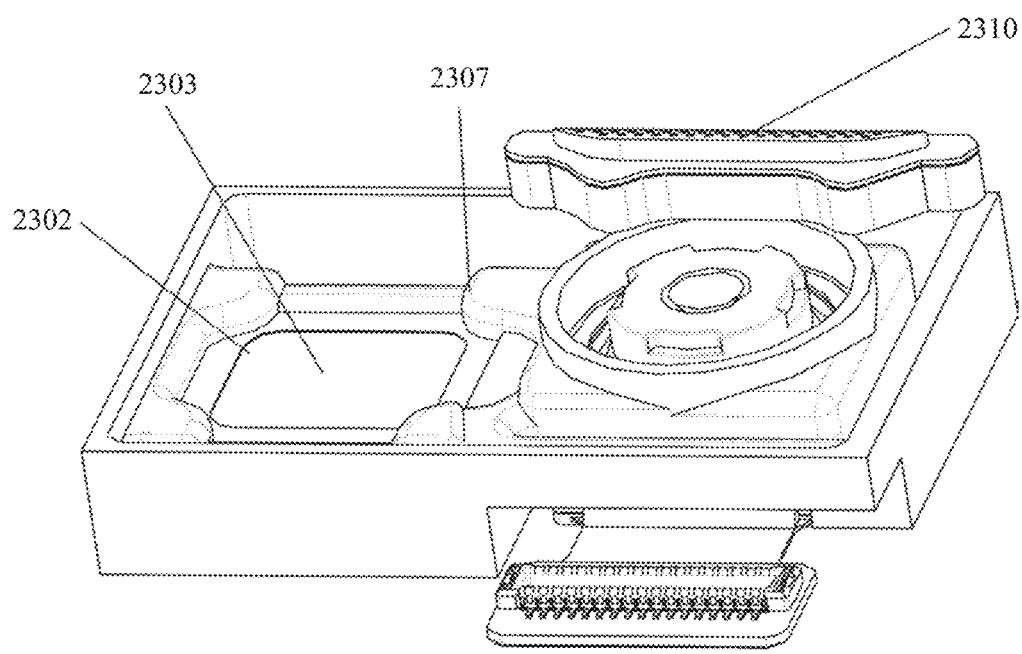
FIG. 35 is a schematic diagram of a partial structure of another embodiment of a sound-emitting apparatus according to the present invention.

For a specific structure of the first sound cavity 2306, reference may also be made to FIG. 35. FIG. 35 is a schematic top view of a structure of the sound-emitting apparatus 2300 in which the first sound cavity 2306 is arranged.

A holding arm 2307 is formed on a peripheral wall of the first accommodation cavity 2302 in this arrangement manner in an extension direction away from the sound-emitting device 2303, and the holding arm 2307 is configured to hold and fasten the sound-emitting device 2303 inside the first accommodation cavity 2302.

Figure 36:
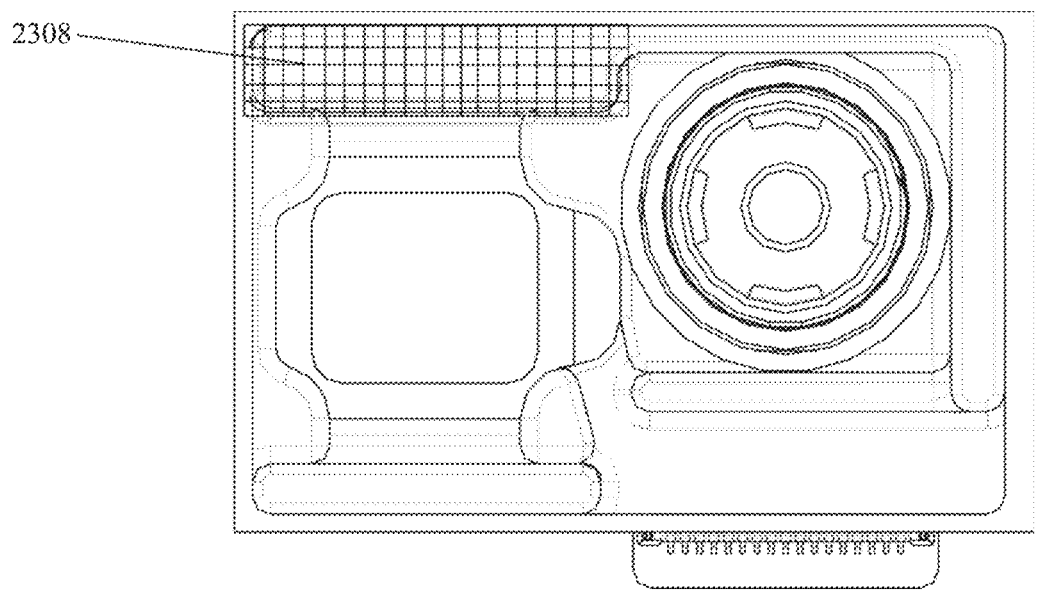
FIG. 36 is a schematic top view of a structure of another embodiment of a sound-emitting apparatus according to the present invention.

With reference to FIG. 36, a third sound cavity 2308 is formed to be recessed between the holding arm 2307 and the top of the sound-emitting apparatus.

It can be learned that, in this arrangement manner, the first sound cavity 2306 and the third sound cavity 2308 are connected through a gap between the holding arm 2307 and the top of the sound-emitting apparatus.

The first sound cavity 2306 in this arrangement manner guides, to the inside of the third sound cavity 2308, the sound emitted by the sound-emitting device 2303.

Figure 33:
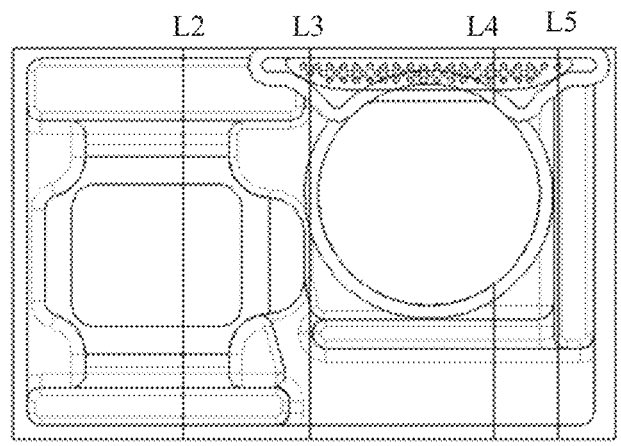
FIG. 33 is a schematic top view of a structure of another embodiment of a sound-emitting apparatus according to the present invention.
Figure 34:
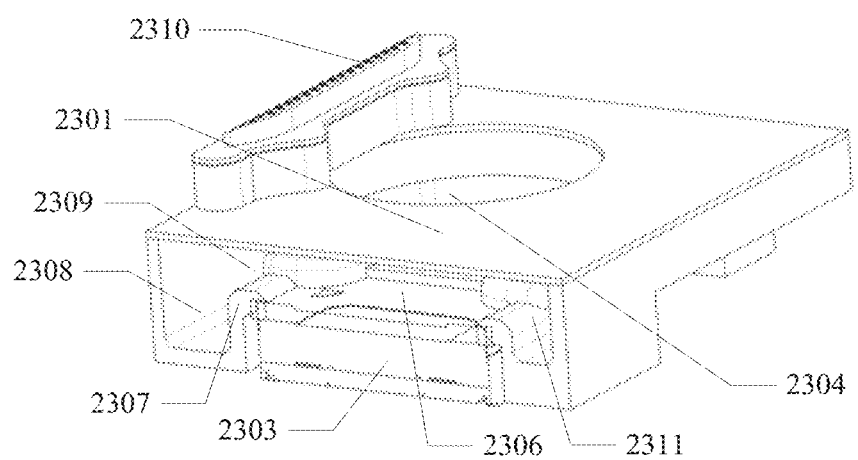
FIG. 34 is a schematic diagram of a partial cross-section structure of an embodiment of a sound-emitting apparatus according to the present invention.
Figure 37:
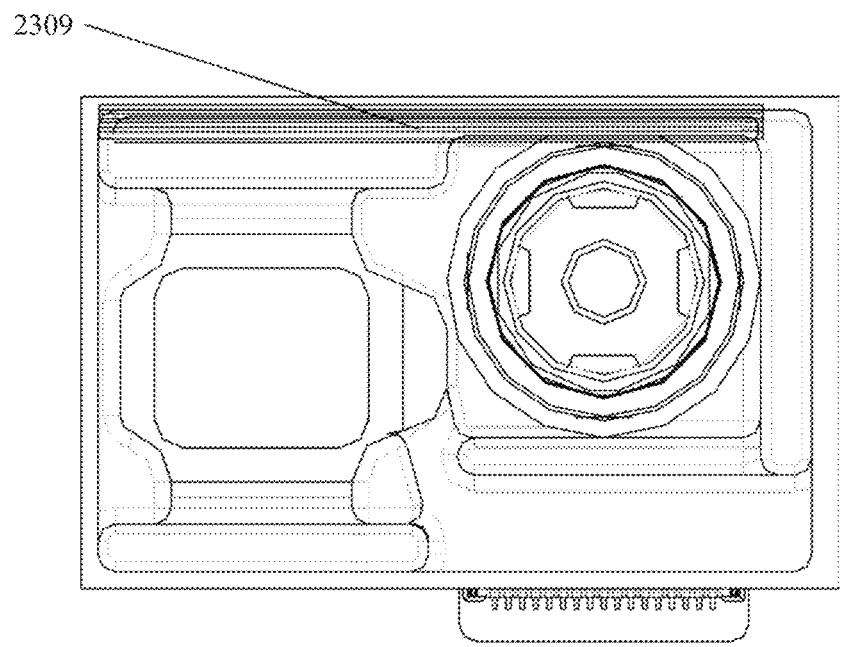
FIG. 37 is a schematic top view of a structure of another embodiment of a sound-emitting apparatus according to the present invention.

Further, with reference to FIG. 32 to FIG. 34, a second sound cavity 2309 is arranged at the top of the sound-emitting apparatus in this arrangement manner, and the second sound cavity 2309 is arranged exactly above the third sound cavity 2308. For a specific structure of the second sound cavity 2309, reference may also be made to FIG. 37. FIG. 37 is a schematic top view of a structure of the sound-emitting apparatus in which the second sound cavity 2309 is arranged.

The second sound cavity 2309 is arranged opposite to an earpiece hole group 2310, and the second sound cavity 2309 and the earpiece hole group 2310 are arranged to be connected to each other, so that the second sound cavity 2309 can guide a sound to the earpiece hole group 2310.

Figure 38:
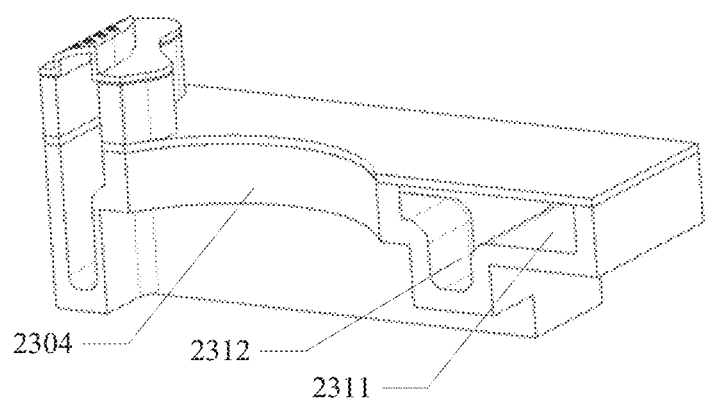
FIG. 38 is a schematic diagram of a partial cross-section structure of another embodiment of a sound-emitting apparatus according to the present invention.

Still refer to FIG. 32 to FIG. 34 and FIG. 38. FIG. 38 is a structural diagram formed by sectioning the structural diagram shown in FIG. 33 by a cross section line L4.

Figure 39:
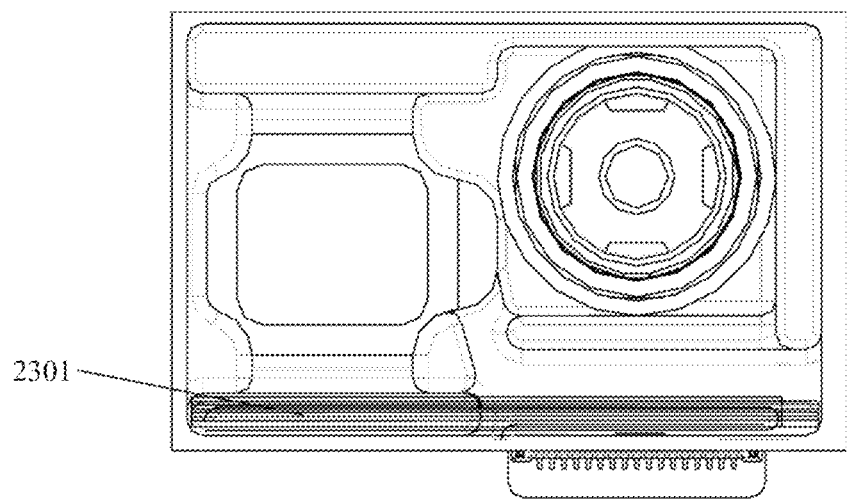
FIG. 39 is a schematic top view of a structure of another embodiment of a sound-emitting apparatus according to the present invention.

A fifth sound cavity 2311 is arranged at the bottom of the sound-emitting apparatus 2300. For a specific structure of the fifth sound cavity 2311, reference may also be made to FIG. 39. FIG. 39 is a schematic top view of a structure of the sound-emitting apparatus in which the fifth sound cavity 2311 is arranged.

Figure 40:
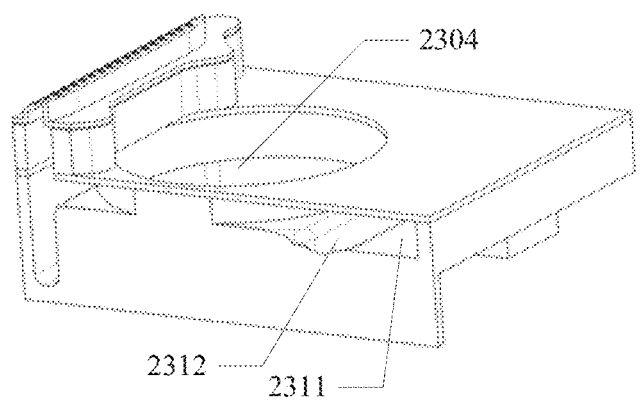
FIG. 40 is a schematic diagram of a partial cross-section structure of another embodiment of a sound-emitting apparatus according to the present invention.

Still with reference to FIG. 40, FIG. 40 is a structural diagram formed by sectioning the structural diagram shown in FIG. 33 by a cross section line L3.

Figure 41:
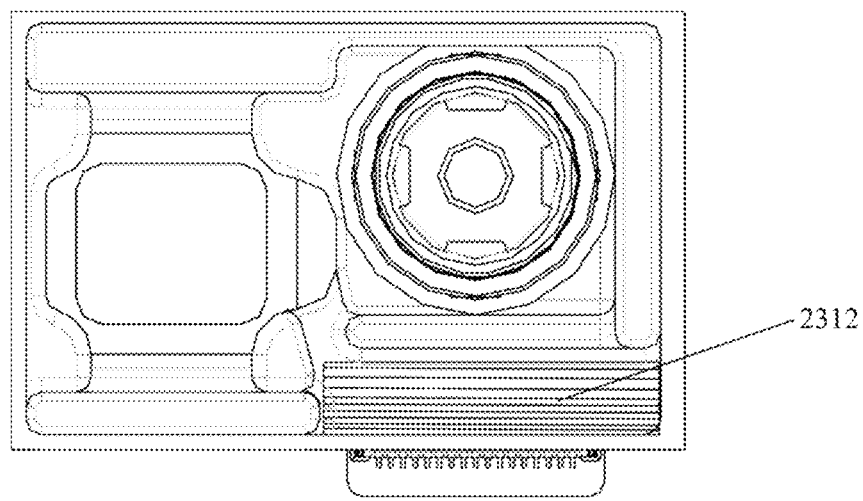
FIG. 41 is a schematic top view of a structure of another embodiment of a sound-emitting apparatus according to the present invention.

A sixth sound cavity 2312 is formed between the fifth sound cavity 2311 and the third accommodation cavity 2304. For a specific structure of the sixth sound cavity 2312, reference may also be made to FIG. 41. FIG. 41 is a schematic top view of a structure of the sound-emitting apparatus in which the sixth sound cavity 2312 is arranged.

It can be learned that the fifth sound cavity 2311 is connected to both the first sound cavity 2306 and the sixth sound cavity 2312.

Figure 42:
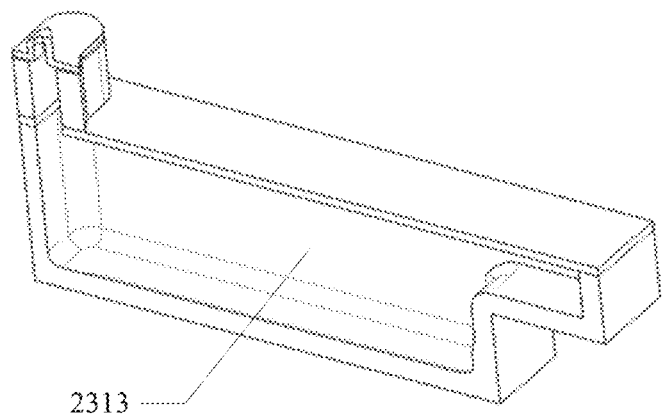
FIG. 42 is a schematic diagram of a partial cross-section structure of another embodiment of a sound-emitting apparatus according to the present invention.
Figure 43:
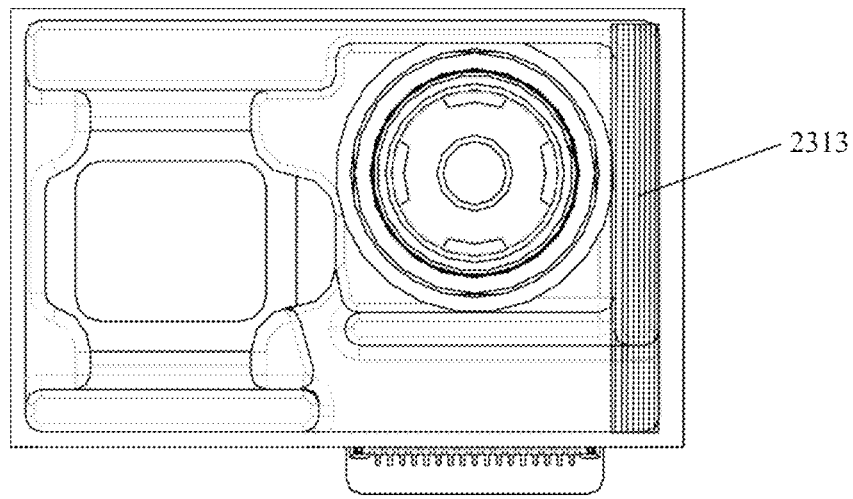
FIG. 43 is a schematic top view of a structure of another embodiment of a sound-emitting apparatus according to the present invention.
Figure 44:
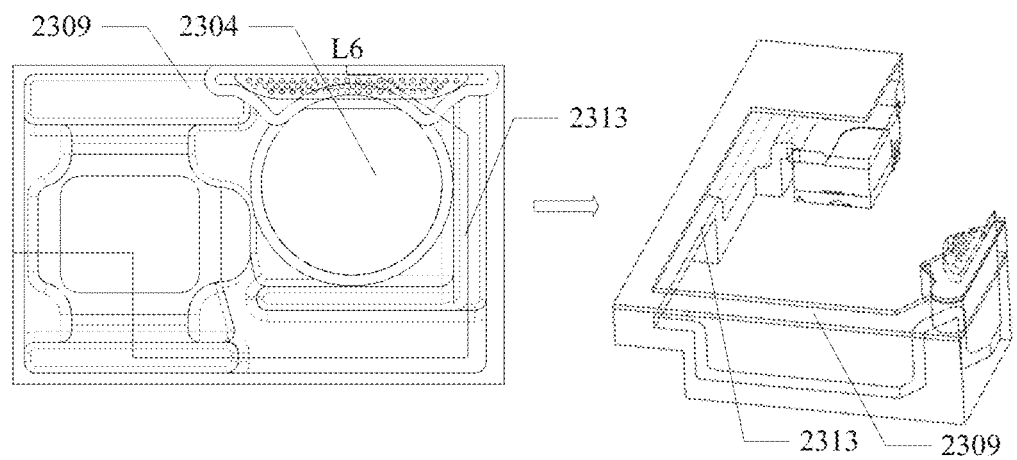
FIG. 44 is a schematic structural diagram of another embodiment of a sound-emitting apparatus according to the present invention.

Refer to FIG. 42 to FIG. 44. FIG. 42 is a structural diagram formed by sectioning the structural diagram shown in FIG. 33 by a cross section line L5. A structural diagram shown on the left side of FIG. 44 is sectioned by a cross section line L6 to form a structural diagram shown on the right side of FIG. 44.

A seventh sound cavity 2313 is further formed between the third accommodation cavity 2304 and the sound-emitting apparatus, the seventh sound cavity 2313 is connected to all of the second sound cavity 2309, the fifth sound cavity, and the sixth sound cavity, and the seventh sound cavity is configured to guide, to the second sound cavity 2309, sounds guided by the fifth sound cavity 2311 and the sixth sound cavity 2312.

The following describes flow directions of a sound of the sound-emitting apparatus in this arrangement manner: There are two sound flow directions inside the sound-emitting apparatus in this arrangement manner. One sound flow direction is as follows: First, a sound emitted by the sound-emitting device 2303 is guided to the first sound cavity 2306. Next, the first sound cavity 2306 guides, to the third sound cavity 2308 that is connected to the first sound cavity 2306, the sound that is guided to the inside of the first sound cavity 2306. Then, the third sound cavity 2308 guides, to the second sound cavity 2309 that is connected to the third sound cavity 2308, the sound that is guided to the inside of the third sound cavity 2308.

The other sound flow direction is as follows: First, a sound emitted by the sound-emitting device 2303 is guided to the fifth sound cavity 2311. Next, the fifth sound cavity 2311 guides, to the sixth sound cavity 2312 that is connected to the fifth sound cavity 2311, the sound that is guided to the inside of the fifth sound cavity 2311. Then, the sixth sound cavity 2312 guides, to the seventh sound cavity 2313 that is connected to the sixth sound cavity 2312, the sound that is guided to the inside of the sixth sound cavity 2312. Then, the seventh sound cavity 2313 guides, to the second sound cavity 2309 that is connected to the seventh sound cavity 2313, the sound that is guided to the inside of the seventh sound cavity 2313.

It can be learned that, in this arrangement manner, the second sound cavity 2309 can receive sounds guided by the third sound cavity 2308 and the seventh sound cavity 2313, so that the second sound cavity 2309 can guide the two sounds to the earpiece hole group 2310.

The following describes how the sound-emitting apparatus specifically guides, to a through-hole in the panel of the terminal device, the sound that is guided by the second sound cavity 2309: Referring to FIG. 30 and FIG. 31, a through slot 3103 is arranged to penetrate an upper cover 3102 of the cavity body 2301. In the direction perpendicular to the display module 201, the through slot 3103 is arranged opposite to the through-hole 205, and the through slot 3103 and the second sound cavity 2309 are arranged to be connected to each other. A sound guiding member 3104 is arranged to be connected to the through slot 3103. In a direction perpendicular to the sound-emitting apparatus 2300, the sound guiding member 3104 includes a first sound guiding cavity 3105 and a second sound guiding cavity 3106 that are connected to each other. A sound guiding cavity 3107 is formed between the first sound guiding cavity 3105 and the second sound guiding cavity 3106, and a height of the sound guiding cavity 3107 is greater than or equal to a preset value. A specific numeral value of the preset value is not limited in this embodiment.

Specifically, the first sound guiding cavity 3105 and the through slot 3103 are arranged to be connected to each other, and a sound-emitting member 3108 is arranged to be connected to the second sound guiding cavity 3106. The earpiece hole group 2310 is arranged to penetrate the sound-emitting member 3108. For detailed description of the earpiece hole group 2310, refer to the foregoing description. Details are not described again in this arrangement manner.

It can be learned that a sound emitted by the sound-emitting device 2303 is guided to the second sound cavity 2309 sequentially through the through slot 3103, the first sound guiding cavity 3105, the sound guiding cavity 3107, the second sound guiding cavity 3106, and the earpiece hole group 2310 of the sound-emitting member 3108, so that the user hears, through the earpiece hole group 2310 that is arranged to be inserted inside the through-hole and that is located in the panel of the terminal device, the sound emitted by the sound-emitting device 2303.

It can be learned that, according to the description of this arrangement manner, the sound-emitting apparatus can guide, in two flow directions, a sound emitted by the sound-emitting device, so that two sounds can both be guided to the through-hole for dissipation. It can be learned that, in this arrangement manner, an effect of and efficiency in guiding, to the through-hole, the sound emitted by the sound-emitting device can be effectively improved. Moreover, arrangement of the sound guiding member can effectively increase a connecting area between the sound cavity and the through-hole, thereby effectively improving an effect of a sound dissipated by the through-hole.

The following uses examples to describe any arrangement manner of arranging a target device in the sound-emitting apparatus. The target device is a device arranged on the panel of the terminal device, and a specific type of the target device may be, for example, any one of an optical proximity sensor, an ambient light sensor, a front camera flash, and a fingerprint sensor.

Figure 45:
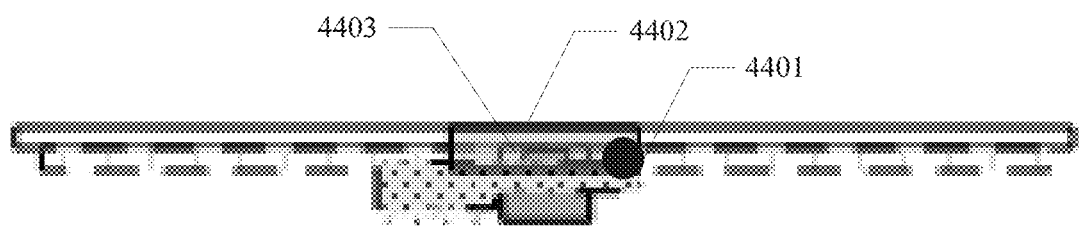
FIG. 45 is a schematic diagram of a partial cross-section structure of another embodiment of a terminal device according to the present invention.

Optionally, with reference to FIG. 44 and FIG. 45, when an earpiece hole group 4403 is arranged to be inserted inside a through-hole 4402, a first gap may be formed between the earpiece hole group 4403 and the through-hole 4402; and in this arrangement manner, a target device 4401 may be arranged inside the first gap formed between the through-hole 4402 and the earpiece hole group 4403.

Figure 46:
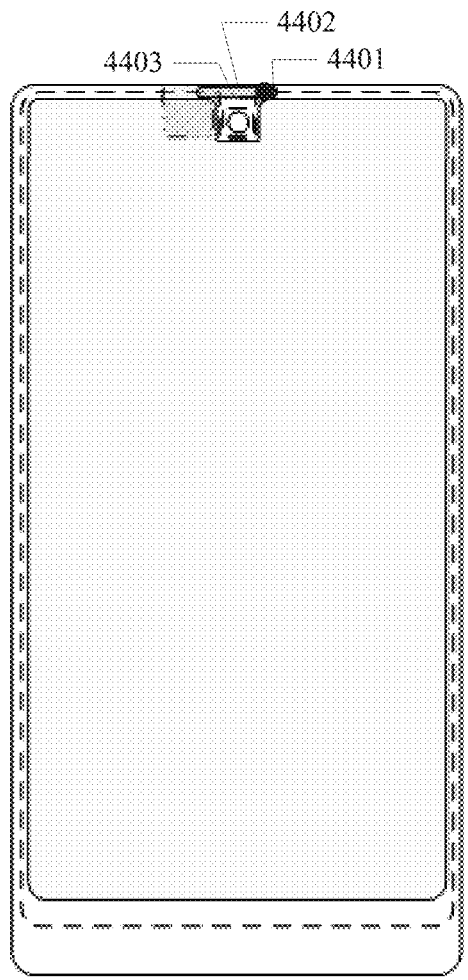
FIG. 46 is a schematic top view of a structure of another embodiment of a terminal device according to the present invention.

FIG. 45 and FIG. 46 are used as an example, and that the first gap is located between the earpiece hole group 4403 and the through-hole 4402 and located on the right side of the through-hole 4402 is used as an example for description in this arrangement manner. Further, optionally, the first gap may be located between the earpiece hole group 4403 and the through-hole 4402 and located on the left side of the through-hole 4402. Still further, optionally, the first gap may be located between the earpiece hole group 4403 and the through-hole 4402 and located on the upper side of the through-hole 4402. Still yet further, optionally, the first gap may be located between the earpiece hole group 4403 and the through-hole 4402 and located on the lower side of the through-hole 4402.

For specific description of the through-hole 4402 and the earpiece hole group 4403, refer to the foregoing descriptions. Details are not described again.

Figure 47:
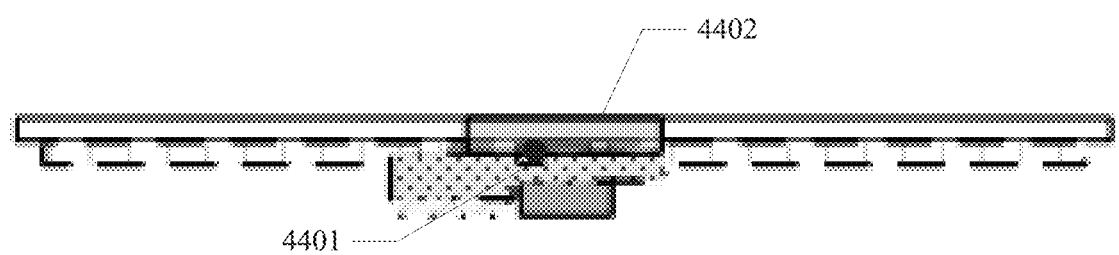
FIG. 47 is a schematic diagram of a partial cross-section structure of another embodiment of a terminal device according to the present invention.
Figure 48:
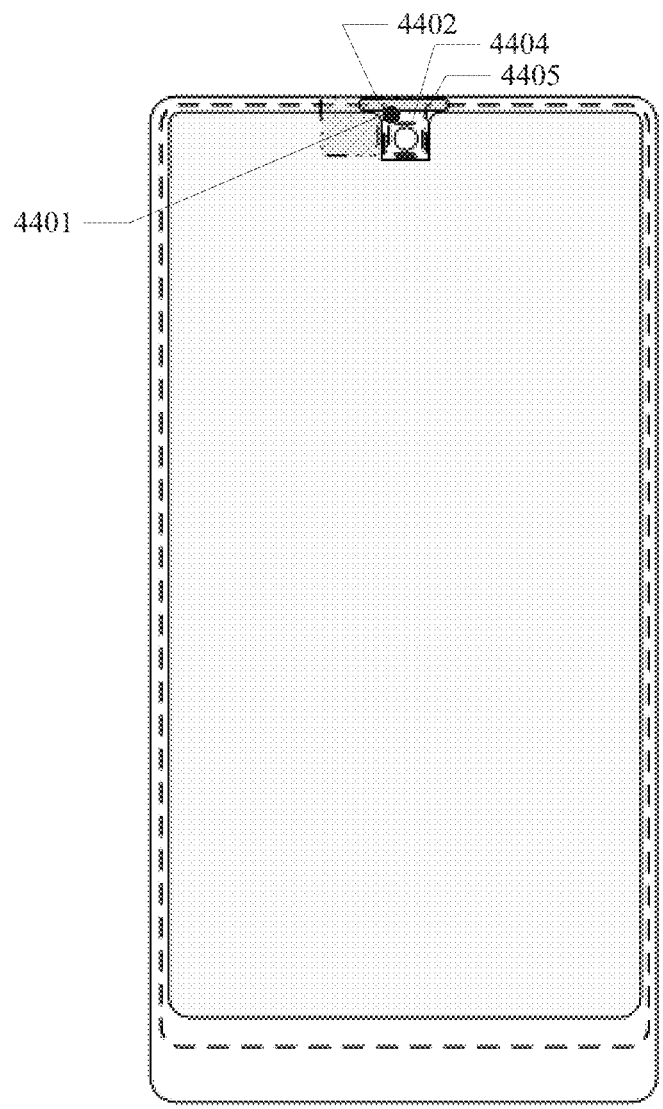
FIG. 48 is a schematic top view of a structure of another embodiment of a terminal device according to the present invention.
Figure 49:
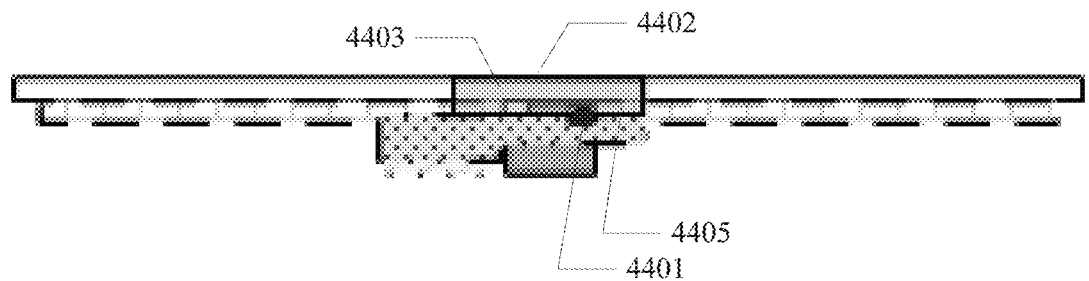
FIG. 49 is a schematic diagram of a partial cross-section structure of another embodiment of a terminal device according to the present invention.
Figure 50:
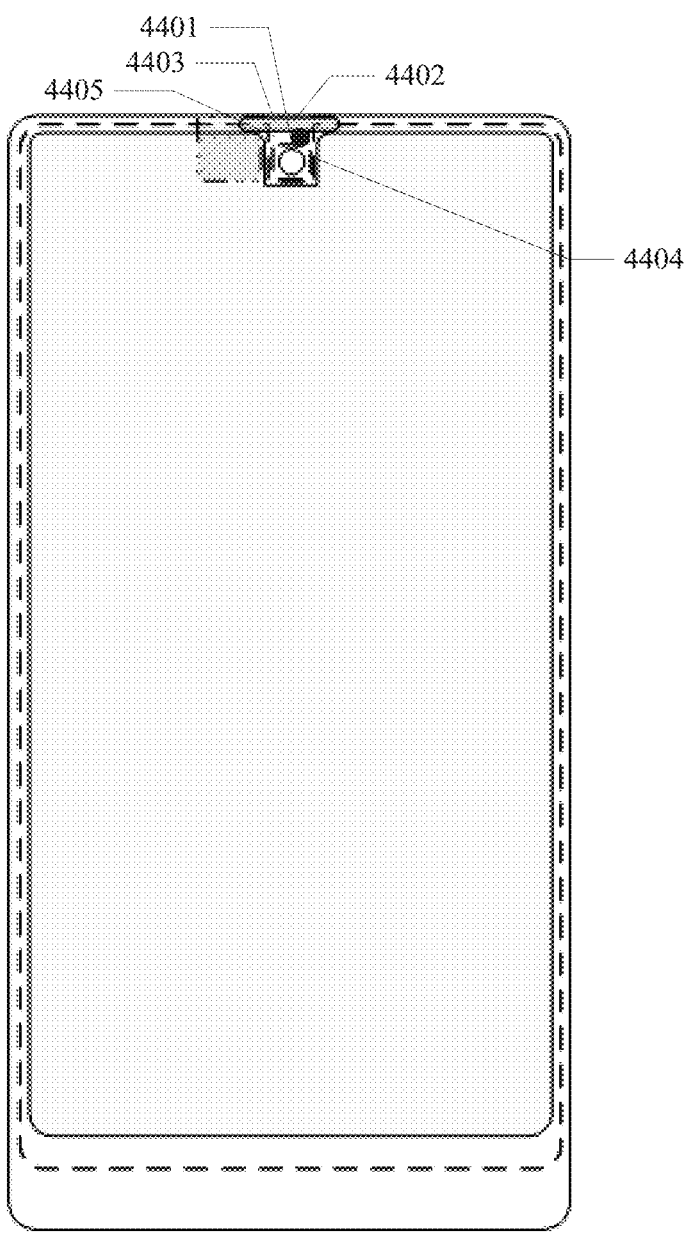
FIG. 50 is a schematic top view of a structure of another embodiment of a terminal device according to the present invention.

Optionally, with reference to FIG. 47 and FIG. 48, a second gap 4405 is formed between a notch 4404 and a through-hole 4402, and in this arrangement manner, the target device 4401 may be arranged at any position in the second gap 4405. For example, with reference to FIG. 47 and FIG. 48, the target device 4401 is arranged on the left side of the second gap 4405. For another example, with reference to FIG. 49 and FIG. 50, the target device 4401 is arranged on the right side of the second gap 4405. For another example, the target device 4401 is arranged at a middle position of the second gap 4405.

Figure 51:
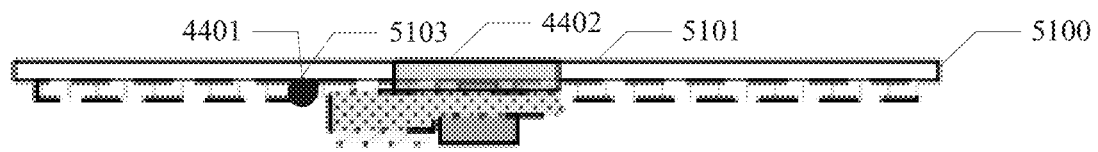
FIG. 51 is a schematic diagram of a partial cross-section structure of another embodiment of a terminal device according to the present invention.
Figure 52:
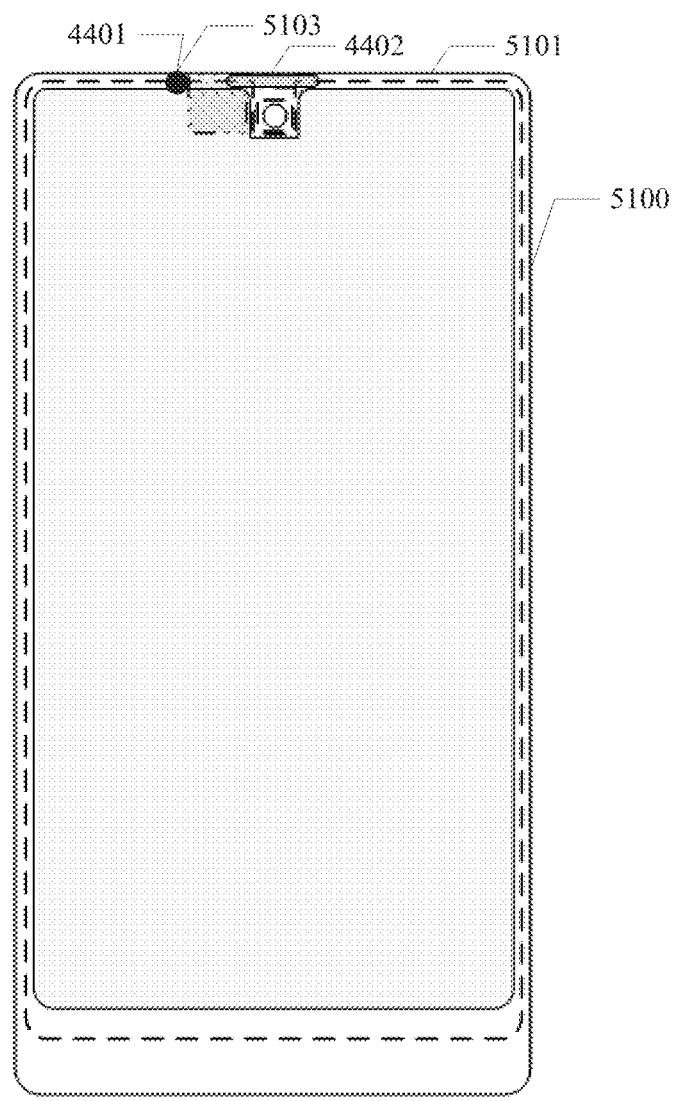
FIG. 52 is a schematic top view of a structure of another embodiment of a terminal device according to the present invention.

Optionally, with reference to FIG. 51 and FIG. 52, an accommodation hole 5103 is arranged in a target edge 5101 of a housing 5100, and the target edge 5101 is an edge, in which the through-hole 4402 is arranged, of four edges included in the housing 5100.

A specific position of the accommodation hole 5103 in the target edge 5101 is not limited in this arrangement manner. In other words, the accommodation hole 5103 in this embodiment may be located at any position in the target edge 5101, and this is not specifically limited.

In this arrangement manner, the target device 4401 may be arranged in the accommodation hole 5103. In other words, a shape of the accommodation hole 5103 fits a shape of the target device 4401, so that the target device 4401 can be fastened inside the accommodation hole 5103.

It can be learned, from the foregoing description of arrangement manners of the target device, that the target device can be arranged within limited space on the panel of the terminal device for the terminal device in this embodiment, thereby effectively improving utilization efficiency of the panel of the terminal device.

The foregoing embodiments are merely intended to describe the technical solutions of the present invention, but not to limit the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A terminal device, comprising:
    a housing comprising a surface;
    a display disposed on the surface and comprising an end;
    a notch in the end;
    a camera system disposed inside the housing opposite the notch, wherein the camera system comprises a camera located inside the notch and oriented in a first direction perpendicular to the display;
    a through-hole in the housing opposite an opening of the notch in a second direction parallel to the display;
    a sound-emitting device inside the housing and below the display, and configured to emit a sound; and
    a sound cavity coupled to the sound-emitting device and the through-hole, wherein the sound cavity is configured to guide the sound to the through-hole, wherein the through hole is configured to guide the sound through the notch, and wherein an overlapping area of the sound-emitting device and the through-hole is equal to a preset value in the first direction, and wherein the preset value is greater than zero.

2. The terminal device of claim 1, further comprising a sound-emitting apparatus disposed inside the housing and comprising a first accommodation cavity configured to accommodate the sound-emitting device, wherein the sound cavity is arranged inside the sound-emitting apparatus.

3. The terminal device of claim 2, further comprising:
a first sound cavity positioned between the sound-emitting device and the sound-emitting apparatus positioned above the sound-emitting device and configured to guide sound; and
a second sound cavity opposite the through-hole in the first direction and configured to guide the sound guided by the first sound cavity to the through-hole.

4. The terminal device of claim 3, wherein the first sound cavity is coupled to the second sound cavity.

5. The terminal device of claim 3, further comprising a third sound cavity between the first sound cavity and the second sound cavity and coupled to both the first sound cavity and the second sound cavity, wherein the third sound cavity is configured to guide the sound guided by the first sound cavity to the second sound cavity.

6. The terminal device of claim 3, further comprising:
a fourth sound cavity inside the sound-emitting apparatus coupled to both the first sound cavity and the second sound cavity, and configured to guide the sound guided by the first sound cavity to the second sound cavity; and
a second accommodation concave cavity recessed in an outer peripheral wall of the fourth sound cavity, wherein the second accommodation concave cavity is configured to fasten the camera system.

7. The terminal device of claim 3, further comprising:
a third accommodation cavity inside the sound-emitting apparatus, wherein the third accommodation cavity is configured to accommodate the camera system;
a fifth sound cavity at a bottom of the sound-emitting apparatus; and
a sixth sound cavity between the fifth sound cavity and the third accommodation cavity, wherein the fifth sound cavity is coupled to both the first sound cavity and the sixth sound cavity.

8. The terminal device of claim 7, further comprising a seventh sound cavity between the third accommodation cavity and the sound-emitting apparatus and coupled to the second sound cavity, the fifth sound cavity, and the sixth sound cavity, wherein the seventh sound cavity is configured to guide sound guided by the fifth sound cavity and the sixth sound cavity to the second sound cavity.

9. The terminal device of claim 2, further comprising a sealing member providing an interference fit between the sound-emitting device and the first accommodation cavity.

10. The terminal device of claim 1, wherein the terminal device is a smartphone, a mobile computer, a tablet computer, a personal digital assistant (PDA), a smart band, a smart watch, a media player, or a smart TV.

11. A sound-emitting apparatus inside a terminal device having a terminal housing and a display disposed on a surface of the housing, wherein the surface comprises a notch, and wherein the sound-emitting apparatus comprises:
a through-hole in the terminal housing, wherein the through-hole is opposite to the notch, and wherein the through-hole is coplanar with the display;
a sound-emitting device inside the terminal housing and below the display and configured to emit sound; and
a sound cavity coupled to the sound-emitting device and the through-hole, wherein the sound cavity is configured to guide the sound through the through-hole, wherein the through-hole is configured to guide the sound through the notch, and wherein an overlapping area of the sound-emitting device and the through-hole is equal to a preset value in a first direction perpendicular to the display, and wherein the preset value is greater than zero.

12. The sound-emitting apparatus of claim 11, further comprising a first accommodation cavity configured to accommodate the sound-emitting device.

13. The sound-emitting apparatus of claim 12, further comprising:
a first sound cavity is positioned between the sound-emitting device and the sound-emitting apparatus positioned above the sound-emitting device and configured to guide the sound; and
a second sound cavity opposite the through-hole in a first direction perpendicular to the display, and configured to guide the sound guided by the first sound cavity to the through-hole.

14. The sound-emitting apparatus of claim 13, wherein the first sound cavity is coupled to the second sound cavity.

15. The sound-emitting apparatus of claim 13, further comprising a third sound cavity between the first sound cavity and the second sound cavity and coupled to both the first sound cavity and the second sound cavity, wherein the third sound cavity is configured to guide the sound guided by the first sound cavity to the second sound cavity.

16. The sound-emitting apparatus of claim 13, further comprising:
a fourth sound cavity disposed inside the sound-emitting apparatus and coupled to both the first sound cavity and the second sound cavity, wherein the fourth sound cavity is configured to guide the sound guided by the first sound cavity to the second sound cavity; and
a second accommodation concave cavity recessed in an outer peripheral wall of the fourth sound cavity wherein the second accommodation concave cavity is configured to fasten a camera system.

17. The sound-emitting apparatus of claim 13 further comprising:
a third accommodation cavity disposed inside the sound-emitting apparatus, wherein the third accommodation cavity is configured to accommodate a camera system;
a fifth sound cavity at a bottom of the sound-emitting apparatus; and
a sixth sound cavity disposed between the fifth sound cavity and the third accommodation cavity, wherein the fifth sound cavity is coupled in a configuration to guide the sound to both the first sound cavity and the sixth sound cavity.

18. The sound-emitting apparatus of claim 17, further comprising a seventh sound cavity between the third accommodation cavity and the sound-emitting apparatus and coupled to the second sound cavity, the fifth sound cavity, and the sixth sound cavity, wherein the seventh sound cavity is configured to guide sound guided by the fifth sound cavity and the sixth sound cavity to the second sound cavity.

19. The sound-emitting apparatus of claim 12, further comprising a sealing member providing an interference fit between the sound-emitting device and the first accommodation cavity.

20. The sound-emitting apparatus of claim 11, further comprising:
a notch at an end of the display; and a camera system opposite the notch in a perpendicular direction, wherein a camera of the camera system is located inside the notch.

* * * * *